United States Patent
Eo et al.

(10) Patent No.: US 10,152,814 B2
(45) Date of Patent: Dec. 11, 2018

(54) IMAGE DISTORTION COMPENSATION DISPLAY DEVICE AND IMAGE DISTORTION COMPENSATION METHOD USING THE SAME

(71) Applicant: RAONTECH, Inc., Gyeonggi-do (KR)

(72) Inventors: Sung Wook Eo, Gyeonggi-do (KR); Joon Goo Lee, Seoul (KR); Min Seok Kim, Gyeonggi-do (KR)

(73) Assignee: RAONTECH, INC., Gyeonggi-Do (KR)

( * ) Notice: Subject to any disclaimer, the term of this patent is extended or adjusted under 35 U.S.C. 154(b) by 92 days.

(21) Appl. No.: 15/335,038

(22) Filed: Oct. 26, 2016

(65) Prior Publication Data

US 2017/0206689 A1  Jul. 20, 2017

(30) Foreign Application Priority Data

Jan. 14, 2016  (KR) .................. 10-2016-0004970

(51) Int. Cl.
  *G06T 11/60* (2006.01)
  *G06T 3/40* (2006.01)
  *H04N 9/64* (2006.01)

(52) U.S. Cl.
  CPC ............ *G06T 11/60* (2013.01); *G06T 3/4007* (2013.01); *H04N 9/646* (2013.01)

(58) Field of Classification Search
  None
  See application file for complete search history.

(56) References Cited

U.S. PATENT DOCUMENTS

| | | | |
|---|---|---|---|
| 6,756,993 B2 * | 6/2004 | Popescu | G06T 15/205 345/422 |
| 6,793,350 B1 * | 9/2004 | Raskar | G03B 37/04 353/121 |
| 6,862,375 B1 * | 3/2005 | Keithley | G06K 9/32 358/444 |
| 9,569,824 B2 * | 2/2017 | Jang | G06T 5/006 |
| 2003/0035100 A1 * | 2/2003 | Dimsdale | H04N 17/002 356/124 |

(Continued)

FOREIGN PATENT DOCUMENTS

| JP | 2012-085026 A | 4/2012 |
|---|---|---|
| KR | 101428064 B1 | 8/2014 |
| KR | 1020140117876 A | 10/2014 |

OTHER PUBLICATIONS

KIPO Office Action dated Jan. 31, 2017.

*Primary Examiner* — Jason Pringle-Parker
(74) *Attorney, Agent, or Firm* — Kane Kessler, P.C.; Barry E. Negrin

(57) ABSTRACT

A display device capable of image distortion compensation may be provided that includes a display panel which outputs a compensated video signal. The display panel includes: an input interface controller which receives a video signal; a memory which stores the video signal received by the input interface controller; a memory controller which controls an input and an output of the memory; and an image distortion compensation device which handles a pixel position and a pixel value of the video signal stored in the memory and generates the compensated video signal.

6 Claims, 19 Drawing Sheets
(7 of 19 Drawing Sheet(s) Filed in Color)

(56) References Cited

U.S. PATENT DOCUMENTS

| | | | |
|---|---|---|---|
| 2003/0206179 A1* | 11/2003 | Deering | G06T 3/0081 345/589 |
| 2007/0188633 A1* | 8/2007 | Mandy | G06T 3/0018 348/241 |
| 2007/0268316 A1* | 11/2007 | Kajita | G06T 5/006 345/642 |
| 2009/0148036 A1* | 6/2009 | Aoyama | G06T 5/006 382/154 |
| 2011/0148907 A1* | 6/2011 | Lee | G09G 3/2003 345/590 |
| 2014/0375845 A1* | 12/2014 | Lee | G06T 5/003 348/241 |
| 2015/0256702 A1* | 9/2015 | Sano | H04N 1/02481 358/463 |
| 2015/0379697 A1* | 12/2015 | Pohl | G06T 5/006 345/589 |
| 2016/0247255 A1* | 8/2016 | Staudenmaier | G02B 27/0025 |
| 2017/0161880 A1* | 6/2017 | Choi | G06T 5/006 |
| 2017/0295353 A1* | 10/2017 | Hwang | H04N 13/0018 |

\* cited by examiner

[FIG. 1]
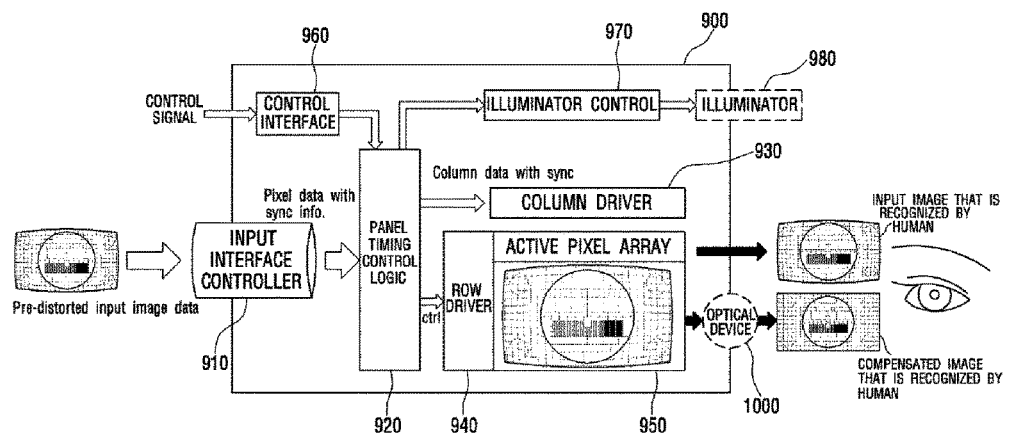

[FIG. 2]
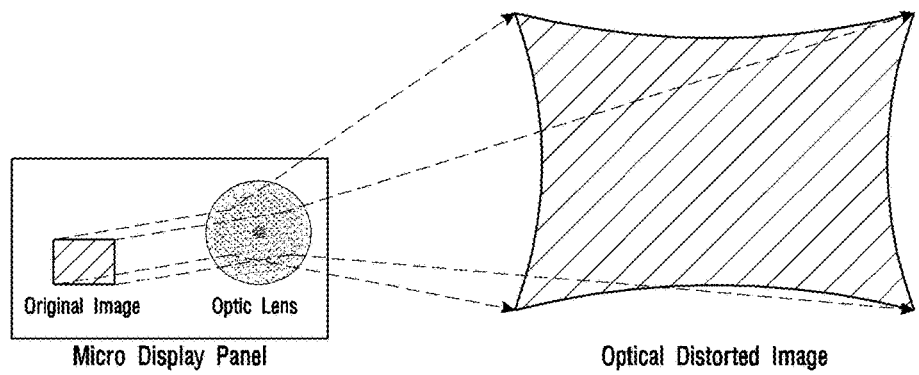
[FIG. 3]
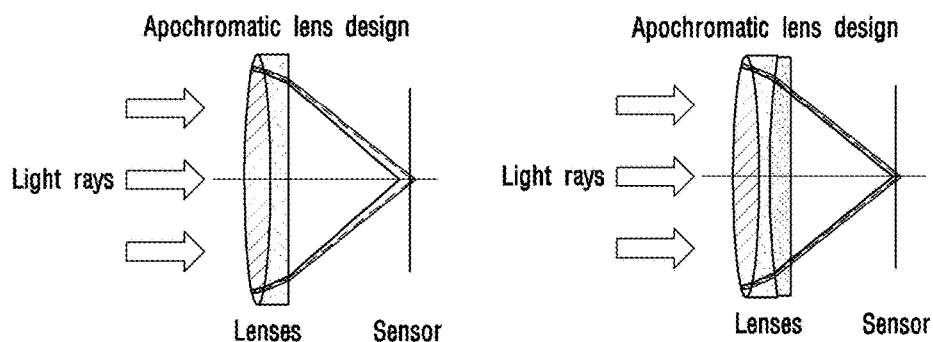
[FIG. 4]
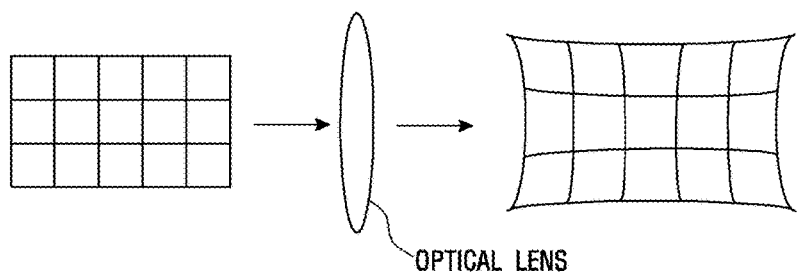

[FIG. 5]
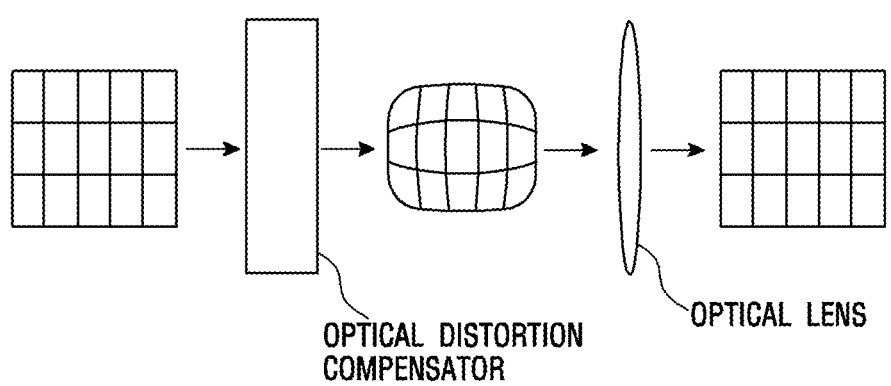

[FIG. 6a]
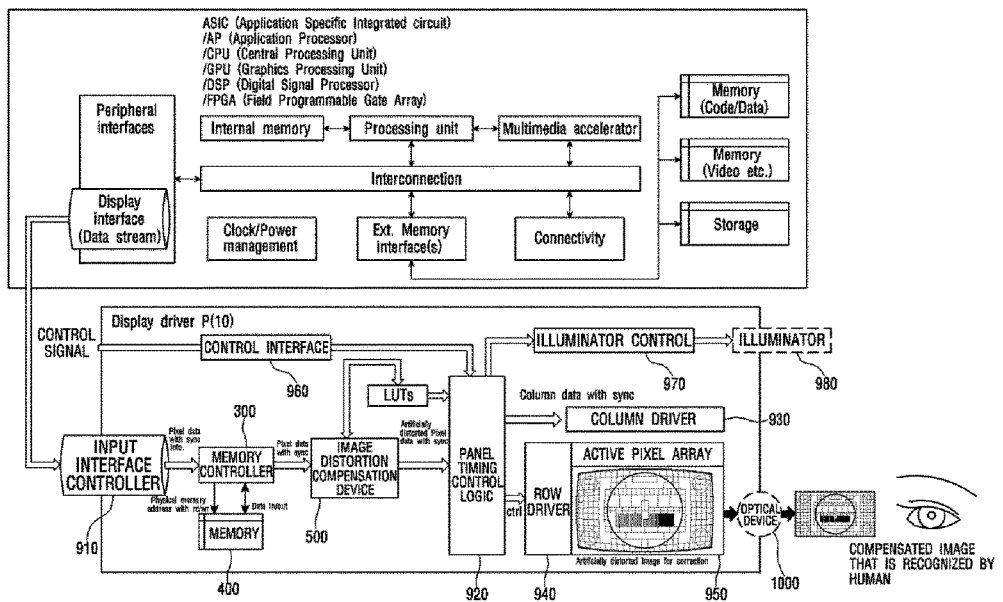

[FIG. 6b]
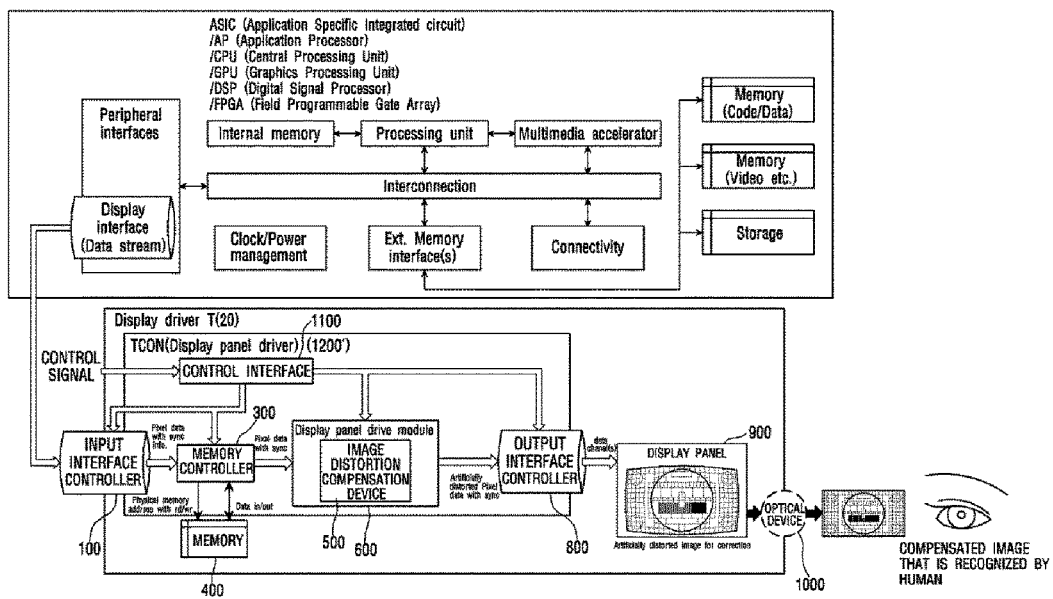

[FIG. 6c]
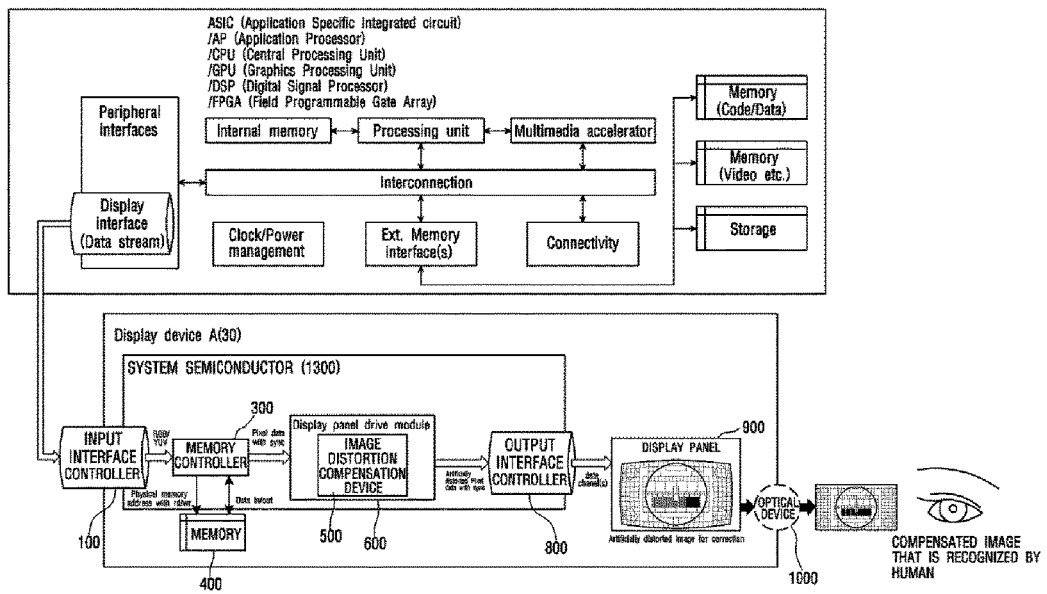

[FIG. 6d]
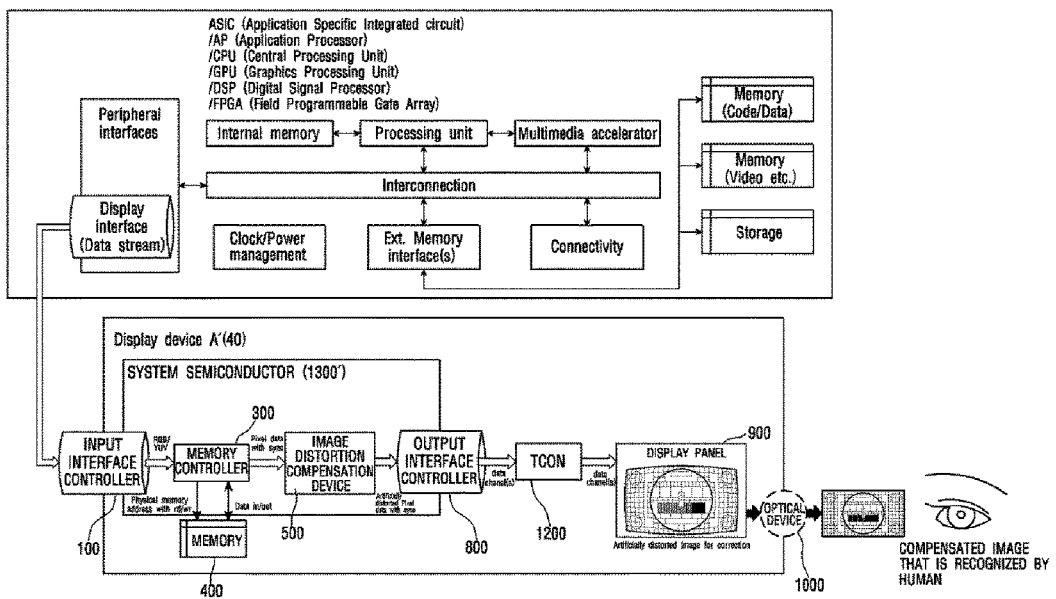

[FIG. 7]
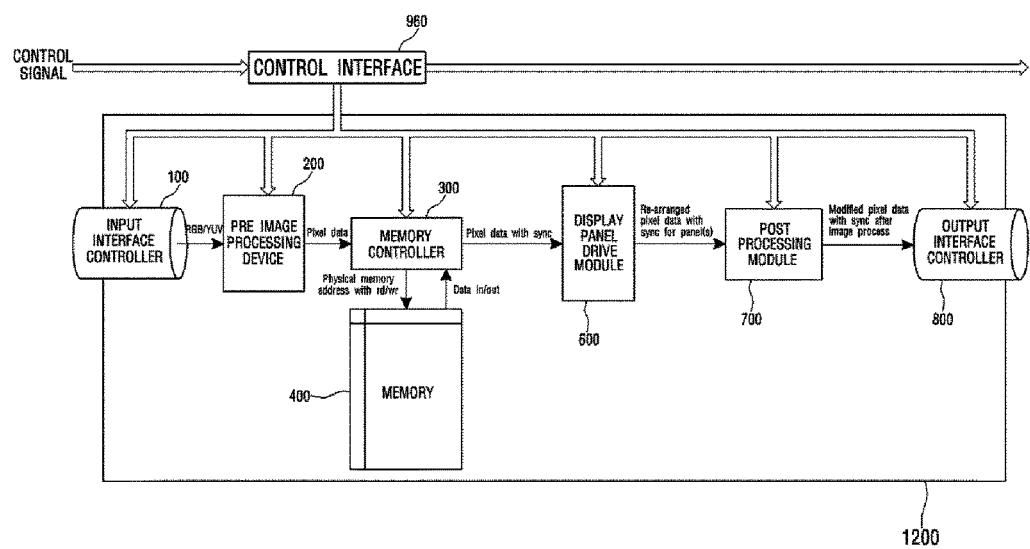

[FIG. 8]
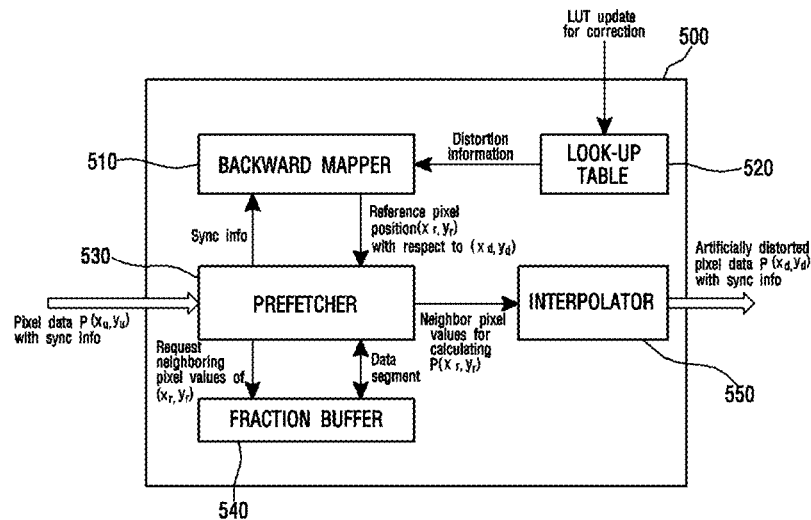
[FIG. 9]
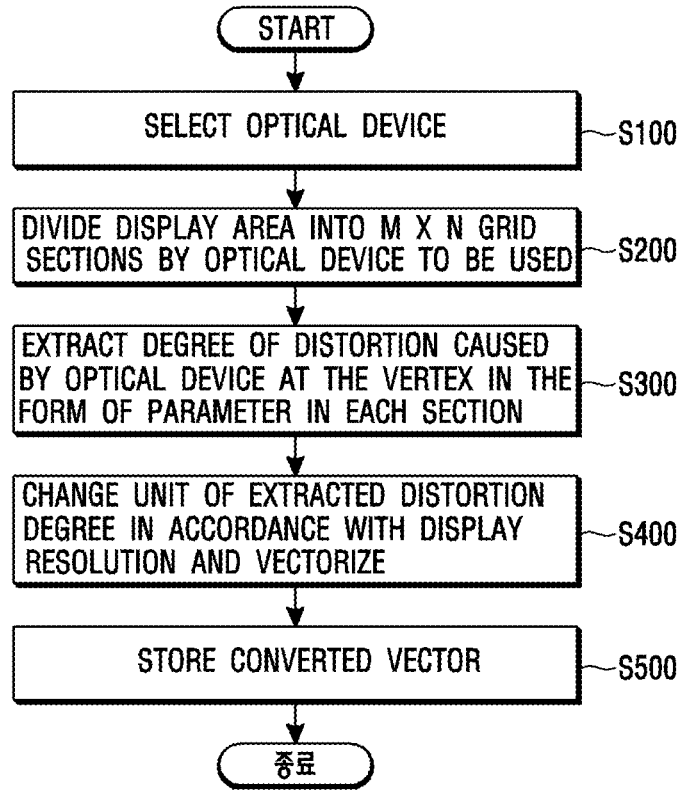

[FIG. 10]
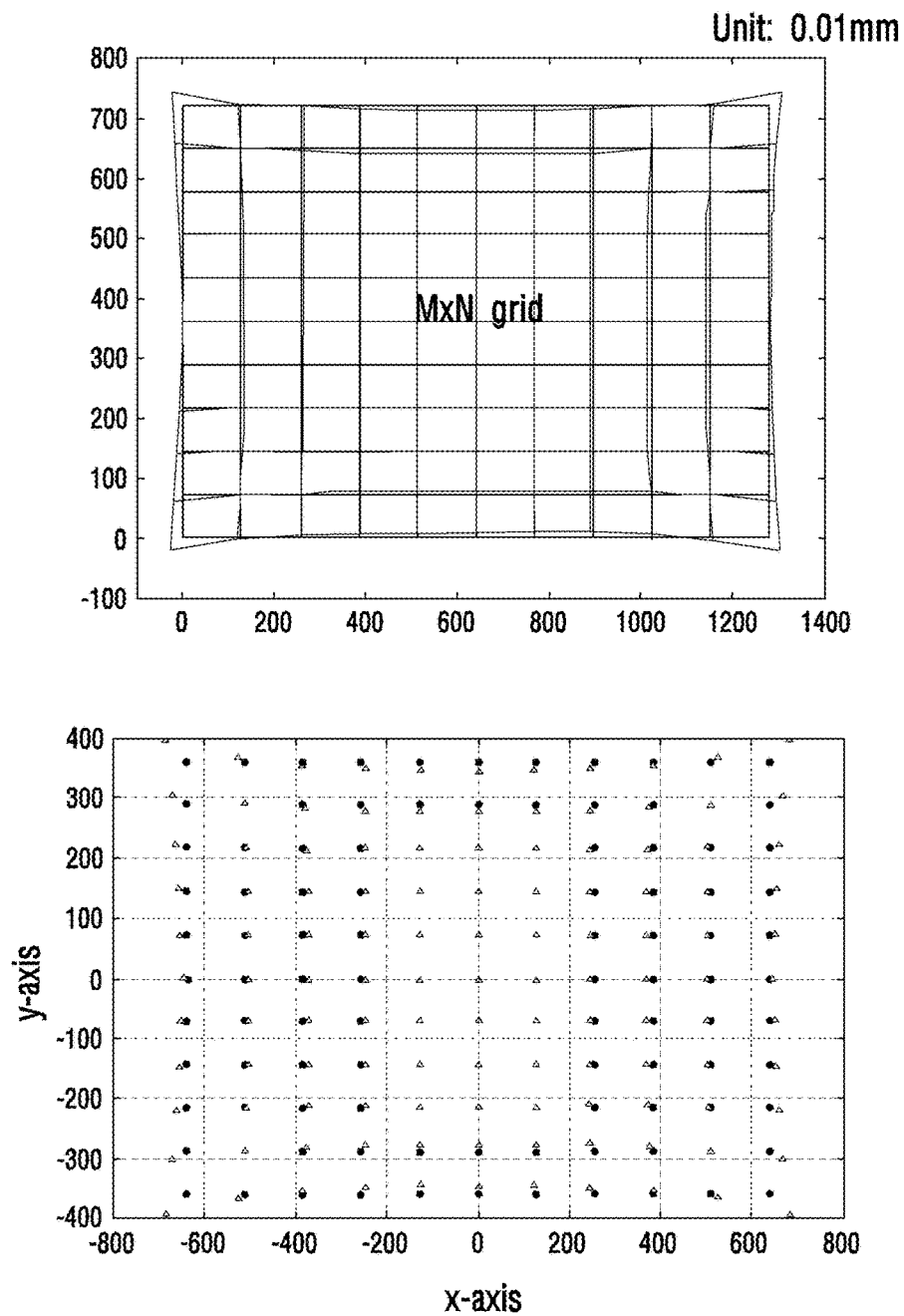

[FIG. 11]
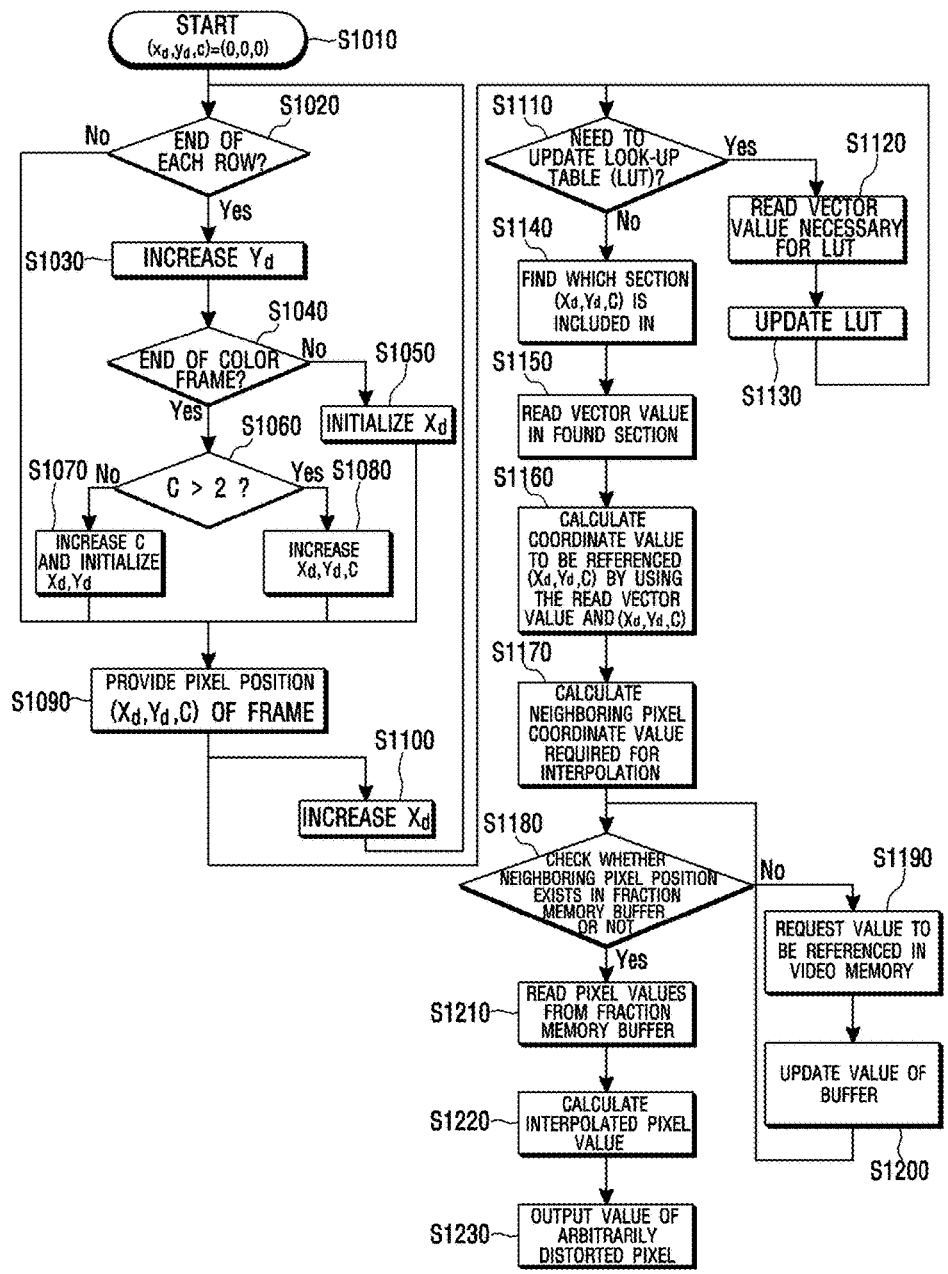

[FIG. 12a]
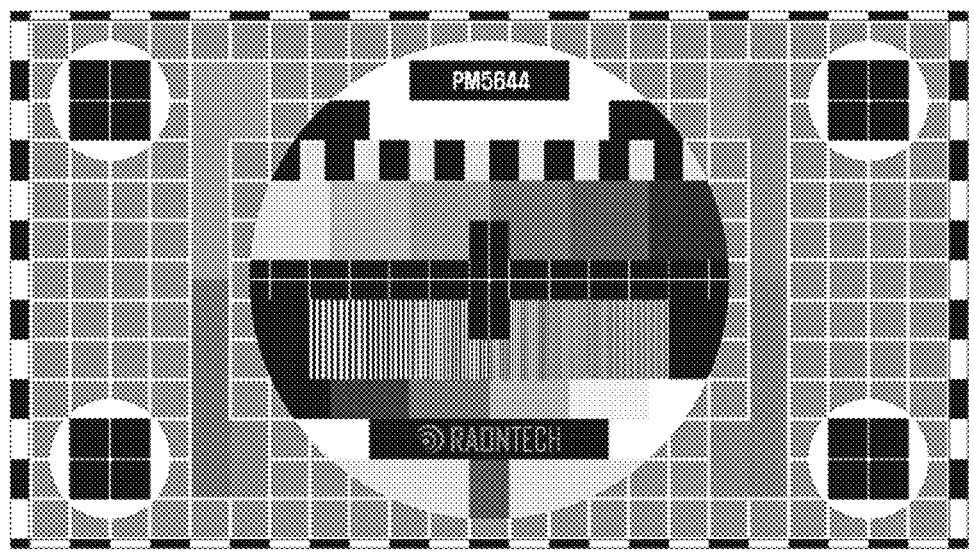
[FIG. 12b]
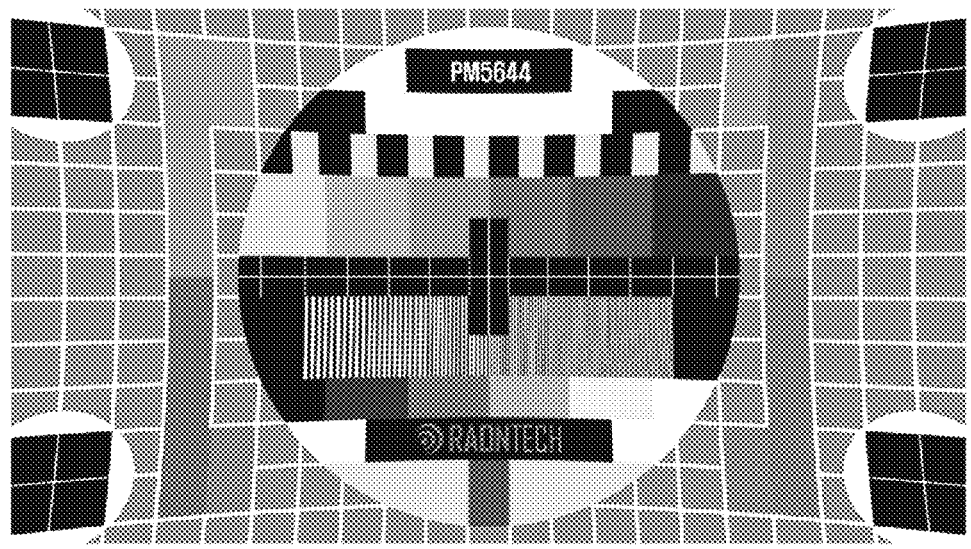

[FIG. 12c]
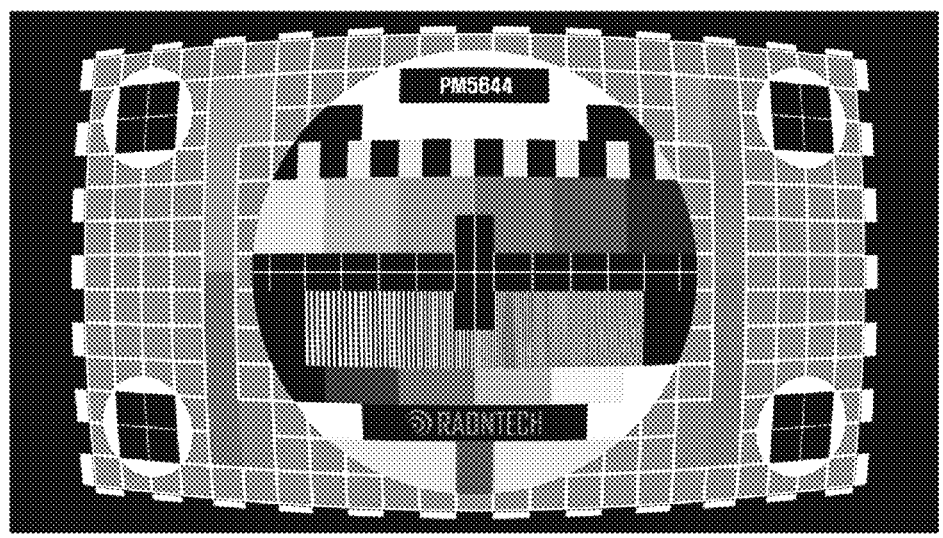
[FIG. 12d]
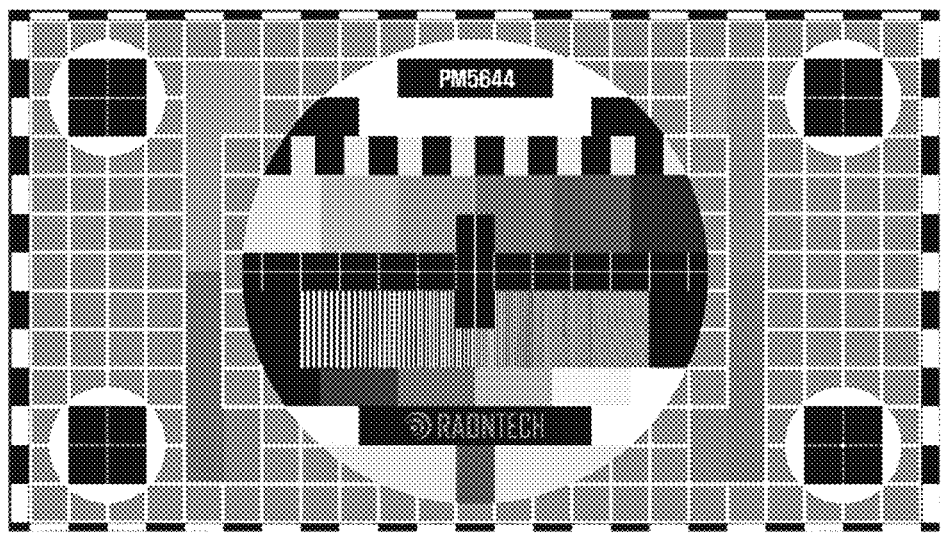

[FIG. 13a]
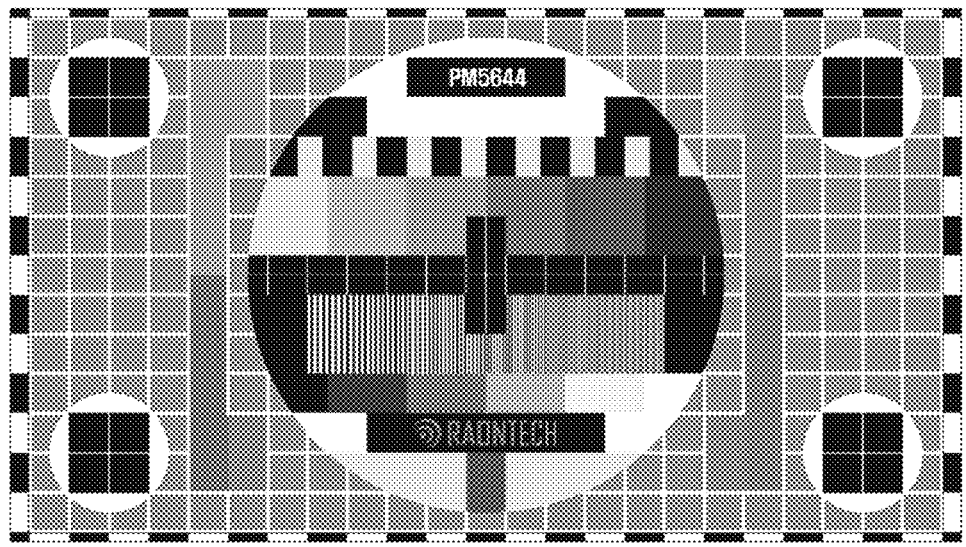
[FIG. 13b]
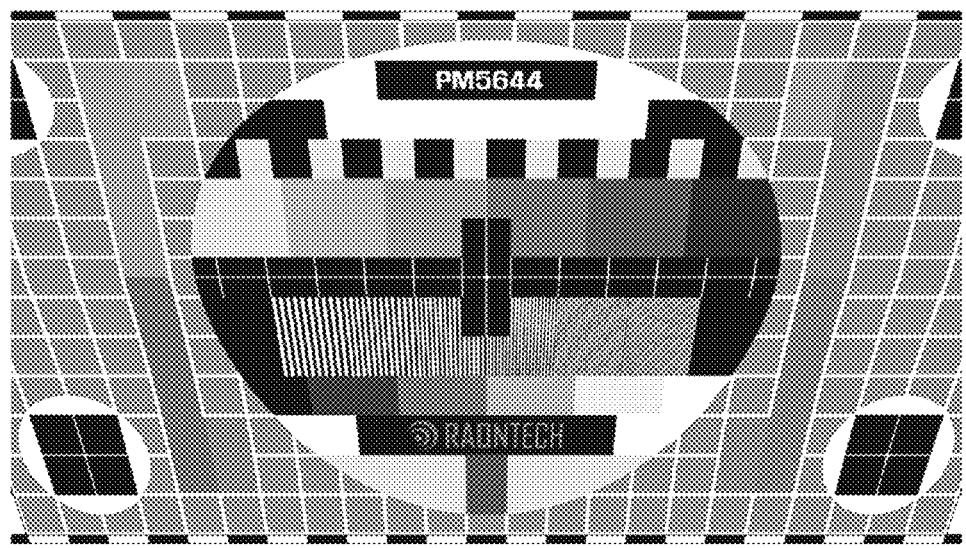

[FIG. 13c]
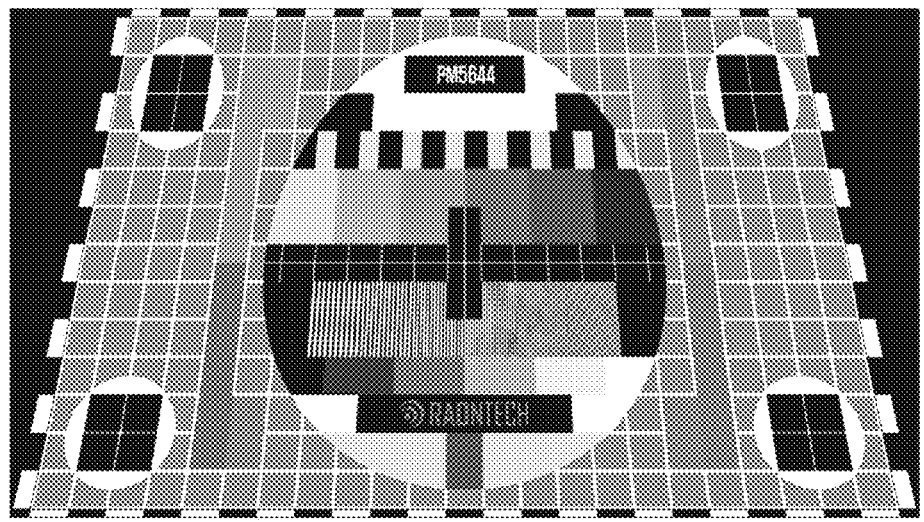
[FIG. 13d]
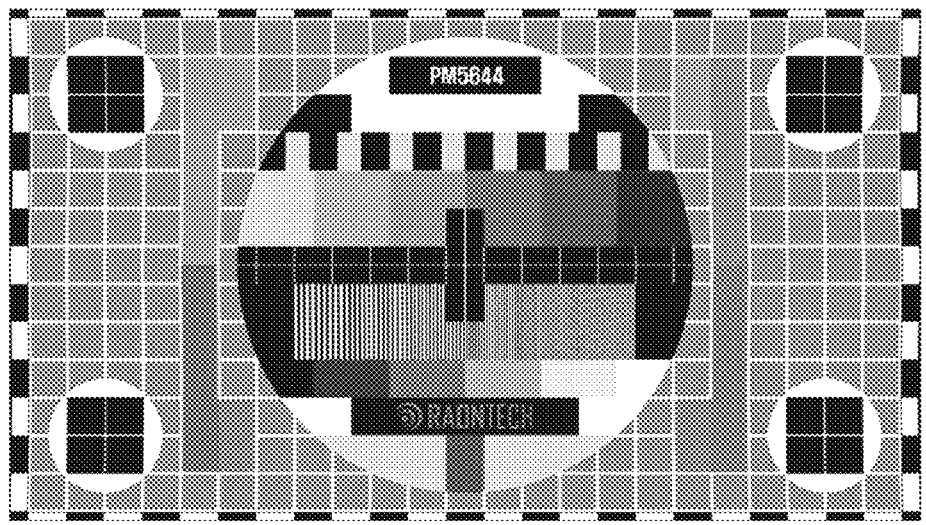

[FIG. 14a]
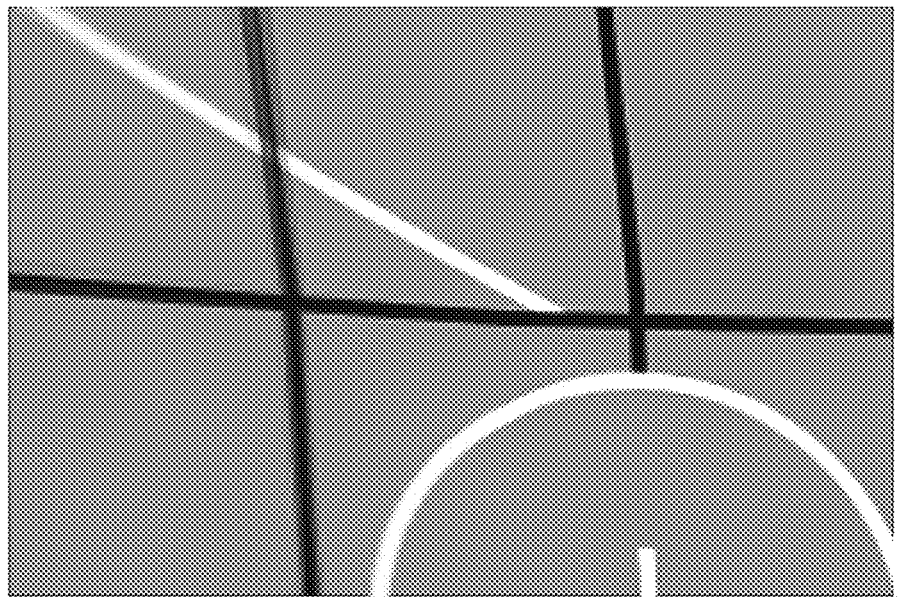
[FIG. 14b]
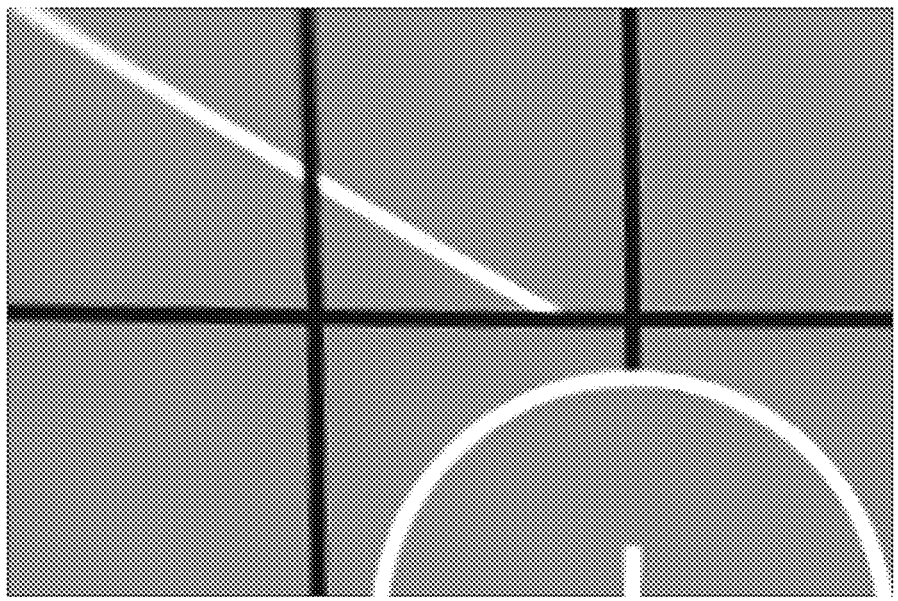

[FIG. 16a]
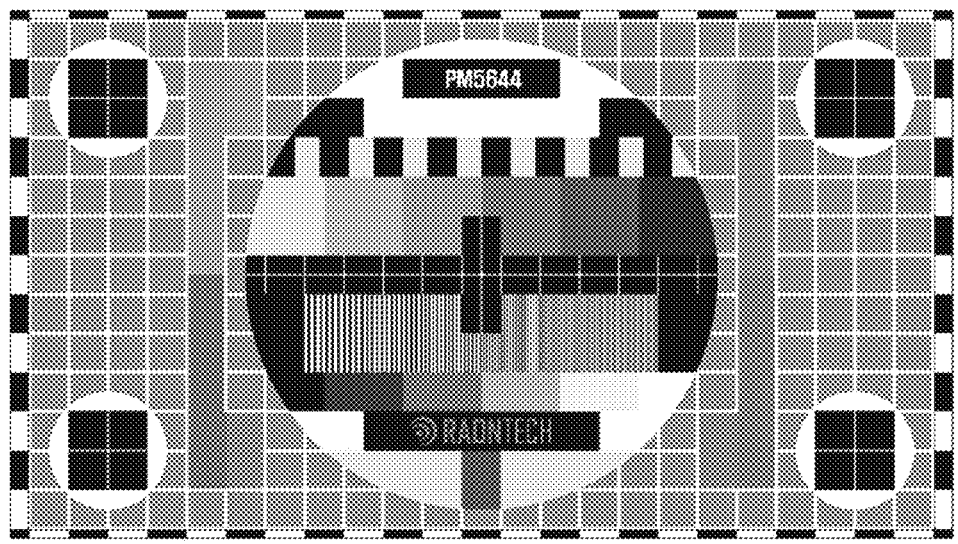
[FIG. 16b]
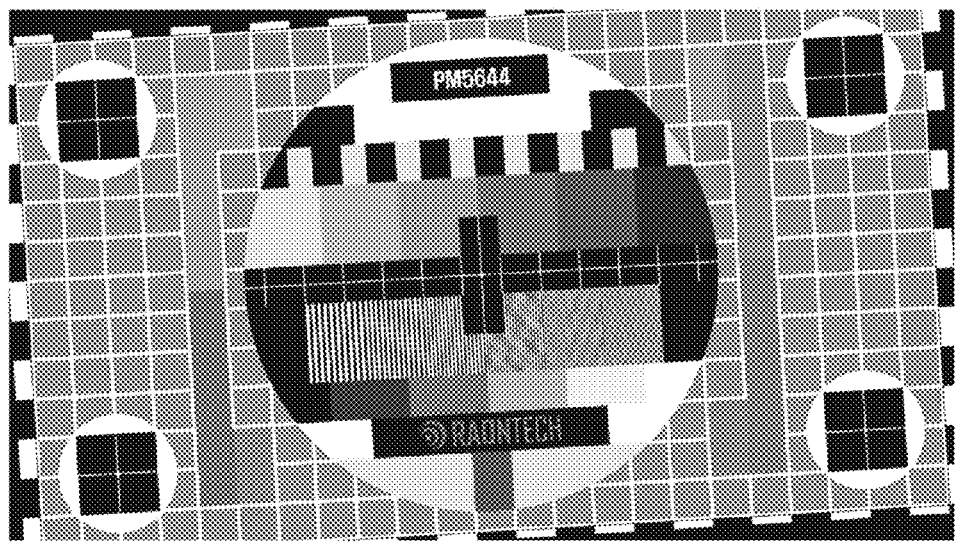

[FIG. 17a]
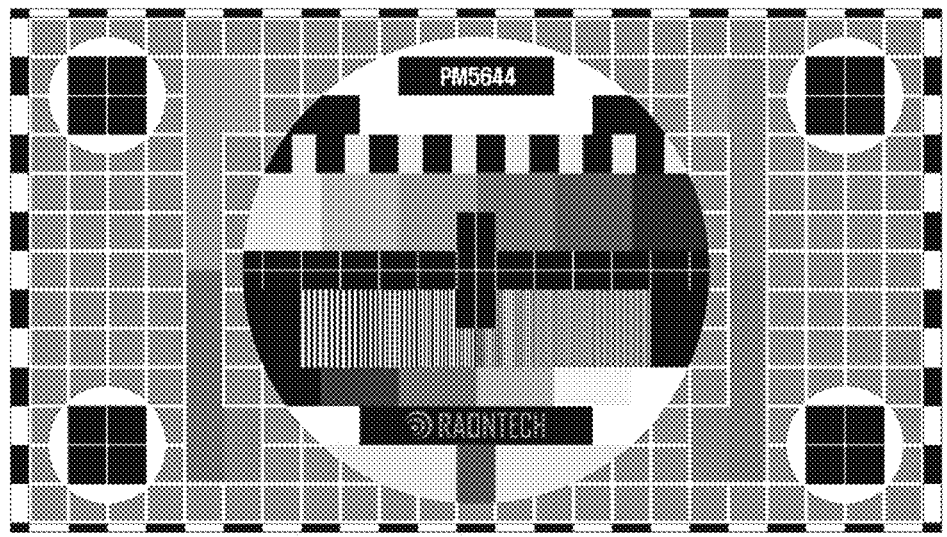
[FIG. 17b]
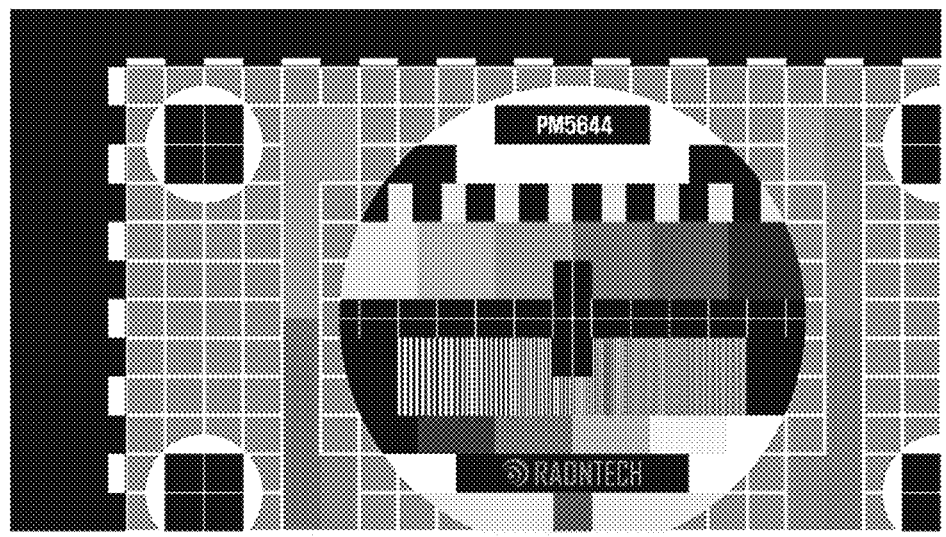

IMAGE DISTORTION COMPENSATION DISPLAY DEVICE AND IMAGE DISTORTION COMPENSATION METHOD USING THE SAME

BACKGROUND

Field

The present disclosure relates to a display device capable of image distortion compensation and an image distortion compensation method using the same, and more particularly to a display device capable of image distortion compensation through the handling of video signal inputted thereto during the driving of any image display panel, and an image distortion compensation method using the display device.

Description of the Related Art

Recently, with the beginning of enlarging the image of a small display panel to a big virtual image by using an optical device in order to implement virtual reality (VR) and augmented reality (AR), a technology is being used, which compensates image distortion caused by the optical device. In order to compensate the distortion of photos or videos, etc., caused by optics, a technology for reducing the distortion of an original digital image is used, in which an artificially distorted image is calculated in advance through software and is stored in a buffer, etc., and then is transferred to and reproduced by a display device. Here, the artificially distorted image is calculated in advance by a central processing unit (CPU), a graphics processing unit (GPU), general-purpose computing on graphics processing units (GPGPU), etc. Also, in order to compensate the distortion of photos or videos, etc., caused by optics, a technology is used which stores the image in the form of a file by converting the image into a distorted image in consideration of a specific optical device, and then transfers the converted image to the display panel and reproduces it. Such an image conversion process requires complex operations and frequent video memory access, so that the image conversion is difficult to perform in real time. Therefore, a method is mainly used which generates in advance video information to be transmitted to the display device by means of a separate software content manufacture tool. However, the video signal to be transmitted to the display device has been already distorted. Therefore, when the video signal is displayed on a screen of a general display device, there may occur a problem that the image is recognized as an abnormal image. Meanwhile, in order to compensate the image in real time, as with Oculus Rift, a central processing unit of a desktop level and parallel processing of a graphics processing unit should be used. However, in order to compensate the image in the display device in real time, a reverse process almost the same as the process of distorting the video signal should be performed. Therefore, when a software method is used, a powerful CPU, a powerful GPU, or a powerful GPGPU is required, so that it is inevitable that cost and power consumption are increased.

Unlike a panel used in a typical monitor, a display panel used in a head mounted display (HMD), a head up display (HUD), or a Pico-Projector, etc., magnifies and projects, as shown in FIG. 2, a small image by using an optical device. Therefore, when a user sees a final image, various distortions may occur. Particularly, a pincushion or barrel distortion occurring when a high magnification optical device is used to enlarge a small image to a big virtual image causes the edge of an inputted image to be warped, affecting the image quality. Accordingly, such a distortion is an obstacle when a user enjoys the video information.

Also, a perspective distortion or aberration distortion, etc., may occur according to the design of the optical device in a complicated manner.

The perspective distortion causes a distorted image (Keyston) like a trapezoid instead of a rectangle due to the disproportional horizontal and vertical ratio of the image. A high magnification lens may result in chromatic aberration in which a color to be displayed is distorted due to a refractive index difference according to the wavelength of light. This distortion just has a degree of difference and is inevitable when using the optics, so that the distortion cannot be completely removed. Therefore, the distortion is intended not to be recognized by human. For this purpose, as shown in FIG. 3, a method, etc., is generally used which changes the design of the optical device by using an expensive lens made through a combination of a convex lens and a concave lens, a prism, a mirror, etc., or compensates and improves the image through digital image processing.

The technology for compensating the image distortion caused by optics is mainly used to change an image stored in a state of already being distorted by photographing by a camera into a digital image and to compensate the digital image in the future through a software algorithm by means of a digital signal processing device, etc., such as a graphics processor or a digital signal processor (DSP), or is mainly used to improve the image quality of the display which displays an image on a curved screen by using a cathode ray, etc. Recently, the technology for compensating the image distortion caused by optics has been used to compensate the distortion of results photographed by a digital camera through the image processing and to store in a storage. As a flat panel display displaying directly pixels like an LCD, OLED, etc., is generally mainly used, there was no requirement for the optical device with the exception of the application of a projector, etc. However, recently, with the beginning of enlarging a small display panel to a big virtual image by using an optical device in order to implement virtual reality and augmented reality, a limited image distortion compensation technology is used.

The distortion caused by optics shows in a complicated manner the distortion caused by the lens, the perspective distortion caused by a difference between the panel where pixels are displayed and a space where the image is displayed, etc. Therefore, the distortion caused by optics shows non-linear characteristics. When the distortion caused by optics is compensated by using the digital image processing, a large amount of operations is required. Also, with the increase of the image resolution to be processed, it is difficult to perform the compensation in real time due to a memory bandwidth limit, a response speed limit, the increase of the amount of operations, etc.

The compensation of the pincushion/barrel distortion by the distortion caused by the lens is frequently based on tangential modeling. In this case, a Cartesian coordinate system is converted into a spherical coordinate system, and a non-linear ratio of a distance and an angle from the center of the lens is calculated through lens modeling by approximating the ratio by means of high-order polynomial operations. As the distortion becomes more complex like a mustache shape, the higher-order polynomial operation is required. The coefficient of the polynomial is used by calculating a distortion constant value extracted from a reference image such as a grid pattern or a calibration target point, etc. A way to reduce the amount of operations by forming pre-computed results in the form of a look-up table in order to easily perform the coordinate conversion, modeling calculations, interpolation, etc., a way to establish a hardware logic performing complex operations such as a trigonometric function or a square root by using COordinate Rotation DIgital Computer (CORDIC), and a way to operate In the form of a linear approximation in accordance with each area by applying a grid to the image have been used individually or in a complicated manner.

However, since the display device could not perform the compensation in real time, the conventional compensation technology is used to handle the video source in advance before transmitting the video information to the display device. A method is used which transmits the already handled video to the display device, and then compensates the distorted image in the future by using optical methods.

Among a variety of aberrations distortions, in particular, the chromatic aberration distortion is compensated by a method which, similarly to the compensation of the pincushion/barrel distortion, performs the high-order polynomial operations through the lens modeling by means of a distortion variable based on R/G/B colors, or blurs the boundary of the image by applying a boundary detection algorithm through use of a phenomenon in which a high frequency region of the image, i.e., a boundary of the image is noticeably recognized, and then increases the sharpness or changes the RGB value of the pixel. Likewise, a method for compensating the distortion through a separate conversion process has been mainly used.

The keyston caused by the perspective distortion is compensated by a method which obtains a projection matrix by using a corner point of a projected image and an operation to which a conversion matrix has been applied using a vanishing point, and performs a backward mapping, or by a method which removes or interpolates pixels in a certain ratio by calculating a ratio in which the image is tilted. Unlike the lens distortion, the keyston caused by the perspective distortion is compensated by a method for controlling a projection direction in a mechanical manner.

To compensate the complex distortions, a method has been used which performs the compensation in order in a pipeline manner by applying algorithms for compensating the distortions respectively. Also, each of the compensation algorithms uses a parallel processing capability of the graphics processor or applies a special hardware design technology to which the pipeline is applied. Each of the distortion compensation algorithms may be designed in such a manner as to apply a technology for approximating the complex operations by using an infinite series or Newton's method and to minimize a division and a multiplication, which have a large computational burden. Also, each of the distortion compensation algorithms minimizes the amount of operations or memory access by using temporal/spatial locality of the pixel. Such a method is not performed in the display device and the video information to be displayed on the screen is handled and then is transmitted to the display device.

In order that a small mobile device uses a technology for mitigating the various distortions caused by optics or uses a technology in which the video signal which has been already distorted and transmitted to the display device is converted again in conformity with the environment of the user who looks at the display device, the compensation technology with a low power and a low cost is required. However, there is a difficulty to solve by the conventional method.

SUMMARY

One embodiment is a display device capable of image distortion compensation. The display device includes a display panel which outputs a compensated video signal. The display panel includes: an input interface controller which receives a video signal; a memory which stores the video signal received by the input interface controller; a memory controller which controls an input and an output of the memory; and an image distortion compensation device which handles a pixel position and a pixel value of the video signal stored in the memory and generates the compensated video signal.

The image distortion compensation device may include: a look-up table which stores a degree of the distortion of an image outputted from the display panel; a backward mapper which receives the degree of the distortion and a synchronization signal and generates a coordinate value $(x_r, y_r)$ of the pixel; a fraction buffer which stores a portion of all of data segments; a prefetcher which receives the data segment and the synchronization signal, requests the fraction buffer to store the data segment, transmits or regenerates the synchronization signal to be transmitted to the backward mapper, loads from the fraction buffer the coordinate value $(x_r, y_r)$ of the pixel and pixel values corresponding to a coordinate value spaced apart from the coordinate value $(x_r, y_r)$ of the pixel by at least 1, and transmits; and an interpolator which interpolates the loaded pixel values received from the prefetcher and outputs to the display panel.

The degree of the distortion may be a parameter k of tangential optical modeling.

A difference between a position of a grid before the distortion and a position of the grid of the distorted image is approximated in the form of a rational number, so that the degree of the distortion may be generated in the form of a vector.

The display device may further include an optical device for magnifying an image that is displayed on the display panel.

Another embodiment is a display device capable of image distortion compensation. The display device includes: a timing controller which receives a video signal and transmits a compensated video signal at an appropriate point of time for a driving method of a display panel; a memory which stores the video signal; and a display panel which outputs the compensated video signal inputted from the timing controller. The timing controller includes: an input interface controller which receives the video signal; a memory controller which controls an input and an output of the memory; an image distortion compensation device which handles a pixel position and a pixel value of the video signal stored in the memory and generates the compensated video signal; and an output interface controller which outputs the compensated video signal to the display panel.

The image distortion compensation device may include: a look-up table which stores a degree of the distortion of an image outputted from the display panel; a backward mapper which receives the degree of the distortion and a synchronization signal and generates a coordinate value $(x_r, y_r)$ of the pixel; a fraction buffer which stores a portion of all of data segments; a prefetcher which receives the data segment and the synchronization signal, requests the fraction buffer to store the data segment, transmits or regenerates the synchronization signal to be transmitted to the backward mapper, loads from the fraction buffer the coordinate value $(x_r, y_r)$ of the pixel and pixel values corresponding to a coordinate value spaced apart from the coordinate value $(x_r, y_r)$ of the pixel by at least 1, and transmits; and an interpolator which interpolates the loaded pixel values received from the prefetcher and outputs to the display panel.

The degree of the distortion may be a parameter k of tangential optical modeling.

A difference between a position of a grid before the distortion and a position of the grid of the distorted image is approximated in the form of a rational number, so that the degree of the distortion may be generated in the form of a vector.

The display device may further include an optical device for magnifying an image that is displayed on the display panel.

The display panel may include: an input interface controller which receives the video signal and transmits pixel values to be transmitted to individual pixels of an active pixel array and a synchronization signal; a control interface which receives a control signal and controls a panel timing control logic; the panel timing control logic which controls operating time points of a column driver, a row driver, and an illuminator control by using the synchronization signal, and transmits the pixel value to the column driver; the column driver which converts the transmitted pixel value into a voltage corresponding to the pixel value, and then transmits the data in a column direction of the active pixel array; the row driver which selects, in a row direction, the pixels to be driven in the active pixel array; the active pixel array which stores an electrical signal received from the column driver and the row driver; and the illuminator control which controls an operating time point and intensity of an illuminator by using the synchronization signal.

Further another embodiment is an image distortion compensation method using a display device capable of image distortion compensation. The method includes: receiving a coordinate value $(x_d, y_d)$ of a pixel of an image to be artificially distorted; dividing an area where an image is displayed into M×N grid sections and finding which section in the sections divided by the M×N grid the coordinate value $(x_d, y_d)$ of the pixel is included in; first loading to read a distortion change amount which is represented by a vector and is at a vertex of the section in which the coordinate value $(x_d, y_d)$ of the pixel is included in the sections; first calculating such that a coordinate value $(x_r, y_r)$ to be referenced is calculated by adding a sum of weight values on the basis of the coordinate value $(x_d, y_d)$ of the pixel and the loaded distortion change amount; second calculating to calculate neighboring pixel coordinate values required for interpolation by using the coordinate value $(x_r, y_r)$ to be referenced; second loading such that read pixel values corresponding to the neighboring pixel coordinate values calculated in the second calculating are read from a fraction memory buffer; third calculating to calculate a pixel value for a compensated output image by applying the weight value on the basis of which pixel coordinate value the coordinate $(x_r, y_r)$ is closer to among the neighboring pixel coordinate values calculated in the second calculating; and outputting to output the pixel value for the compensated output image.

The image distortion compensation method may further include, before the finding, checking whether a look-up table is updated or not and updating the look-up table from the memory.

The look-up table may include a plurality of look-up tables including different color information.

The image distortion compensation method may further include, between the second calculating and the second loading, checking whether a neighboring pixel position exists in the fraction memory buffer or not and reading a data segment from the memory by using the coordinate value to be referenced.

In the finding, when the distortion is within a predetermined range, it may be determined that the distortion has not occurred.

In the finding, an amount of vector data which is stored in a look-up table may be reduced to a half or less by using symmetry.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is a view showing a structure of a display panel according to an embodiment;

FIG. 2 is a view for describing a process of using a conventional optical device;

FIG. 3 is another view for describing a process of using a conventional optical device;

FIG. 4 is a view for describing an image distorted in the form of a pincushion;

FIG. 5 is a view schematically showing that an image distortion compensation device according to the embodiment is used;

FIGS. 6a to 6d show embodiments of a display device capable of compensating the image distortion in accordance with the embodiment;

FIG. 7 is a structure view of a timing controller according to the embodiment;

FIG. 8 is a structure view of an image distortion compensator according to the embodiment;

FIG. 9 is a flowchart for describing the operation of a reference table shown in FIG. 7;

FIG. 10 shows an example of an algorithm to generate a vector value to be stored in the reference table shown in FIG. 7;

FIG. 11 is a flowchart of a compensation method using the image distortion compensation device according to the embodiment;

FIGS. 12a to 12d are views for describing an example of compensating the pincushion-type phenomenon by using the image distortion compensation device according to the embodiment;

FIGS. 13a to 13d are views for describing an example of compensating a vertical keyston distortion of a kind of perspective distortion by using the image distortion compensation device according to the embodiment;

FIGS. 14a and 14b are views for describing an example of compensating chromatic aberration distortion by using the image distortion compensation device according to the embodiment;

FIGS. 15a and 15b are views for describing an example of applying partial enlargement by using the image distortion compensation device according to the embodiment;

FIGS. 16a and 16b are views for describing an example of applying image rotation by using the image distortion compensation device according to the embodiment; and FIGS. 17a and 17b are views for describing an example of applying image movement by using the image distortion compensation device according to the embodiment.

DETAILED DESCRIPTION

Hereinafter, an exemplary embodiment of the present invention will be described in detail with reference to the accompanying drawings. It is noted that the same reference numerals are used to denote the same elements throughout the drawings. In the following description of the present invention, the detailed description of known functions and configurations incorporated herein is omitted when it may make the subject matter of the present invention unclear.

Hereinafter, a display device capable of image distortion compensation and an image distortion compensation method using the same will be described in accordance with an embodiment of the present invention with reference to the accompanying drawings.

FIG. 1 is a view showing a structure of a display panel according to an embodiment. That is, FIG. 1 is a view for describing a display panel 900 which outputs video signal such that an image is displayed in the form of pixels.

Referring to FIG. 1, the display panel 900 according to the embodiment may include an input interface controller 910, a panel timing control logic 920, a column driver (vertical driver or source driver) 930, a row driver (horizontal driver, liner driver, or gate driver) 940, an active pixel array (or active pixel matrix) 950, a control interface 960, an illuminator control 970, and an illuminator 980.

The input interface controller 910 receives a video signal from an external device such as a video information generator. Here, the input interface controller 910 may receive the video signal in a recognizable form. Pixel values to be transmitted to individual pixels of the active pixel array 950 are extracted from the inputted video signal by the input interface controller 910, and then the input interface controller 910 transmits the pixel values and a synchronization signal for synchronization to the panel timing control logic 920.

The panel timing control logic 920 adjusts a timing by using the transmitted synchronization signal such that the image is properly displayed, and transmits the individual pixel value and a control signal to the column or vertical driver 930, the row, horizontal or line driver 940, and the illuminator control 970. The panel timing control logic 920 transmits the synchronization signal to the column driver 930, the row driver 940, and the illuminator control 970, thereby controlling the operating time points of the column driver 930, the row driver 940, and the illuminator control 970.

The individual pixel value transmitted in such a manner is displayed as an image in the active pixel array 950 of the display panel 900 or is synchronized with the illuminator 980 and displayed on a screen.

The column driver 930 converts the transmitted pixel value into a voltage corresponding to the pixel value, and then transmits the data in a column direction of the active pixel array 950.

The row driver 940 selects, in a row direction, the pixels to be driven in the active pixel array 950.

The control interface 960 receives the control signal for controlling the panel from the outside and analyzes, and allows set values of various devices built in the panel to be changed, thereby controlling the brightness of the screen or scanning rate of the screen, etc.

The illuminator control 970 may control the operating time point and intensity of the illuminator 980 by using the synchronization signal.

Here, regarding the display panel such as a micro display or a projector, the image is outputted through an optical device 1000.

FIG. 2 is a view for describing a process of using a conventional optical device. That is, a typical display panel using the optical device is shown in FIG. 2.

As shown in FIG. 2, when an input image is displayed without image distortion compensation, it can be seen that the image is distorted by the optical device, particularly, a high magnification lens. The distorted image is, as shown in FIG. 1, compensated by artificially changing and outputting the image input to the display panel in consideration of lens distortion. The above case is shown as an image which has passed through the optical device and is recognized by a user in FIG. 2. However, depending on the display device, the image may be directly displayed without the optical device. Therefore, when reverse distortion is performed in advance and the video signal is transmitted to the display device such that the distortion is compensated in consideration of a display device using a specific optical device, the user recognized the distorted image as it is. Also, in a case where the compensation process is performed before the video signal is transmitted to the display device, when an optical device different from an expected optical device is used or the size or resolution of the display device is changed, the user sees a complexly distorted image without compensating the distortion.

FIG. 4 is a view for describing the image distorted in the form of a pincushion. FIG. 5 is a view schematically showing that an image distortion compensation device according to the embodiment is used.

FIG. 4 shows that the image is distorted in the form of a pincushion by a lens. In order to compensate the distortion of the image, as shown in FIG. 5, after the output image prior to passing through the lens is distorted in the form of a barrel, the distorted image is outputted through the lens, so that the user recognizes the image as a normal image.

FIGS. 6a to 6d show embodiments of a display device capable of compensating the image distortion in accordance with the embodiment.

Referring to FIGS. 6a to 6d, the image distortion compensation device according to the embodiment can be implemented by various display devices. The display devices shown in FIGS. 6a to 6d may receive the video information from a variety of video transmission apparatuses, for example, a PC, a gaming console, set-top boxes, smart phones, smart pad, video players, digital cameras and digital camcorders, etc. The video transmission apparatus is generally formed of an application processor, an application specific integrated circuit (ASIC), CPU, GPU, GPGPU, DSP, a field programmable gate array (FPGA), etc. These video transmission apparatuses are comprised of an operation and control processing unit, internal/external memory, a storage device, a connection device such as a bus interface, etc., a peripheral Interface, or the like. The video transmission apparatus plays video signal stored in the storage device, synthesizes the video signal in real time by software programs, and then transmits the video signal to the display device through various display interfaces.

The video transmission apparatus may house a multimedia accelerator like Codec, etc., for easily synthesizing, playing, and transmitting the video. For the application of virtual reality, augmented reality, etc., these apparatuses distort and transmit the image with the assumption of a specific display and an optical device. This is because a typical display device does not have a sufficient computing power to process the image distortion with the exception of simple image processing or compensation function such as contrast and brightness control, gamma correction, etc. For this reason, when the video transmission apparatus estimates the image distortion and performs reverse distortion on the image such that the user feels a normal image, most of the displays show the user the image distorted by the video transmission apparatus as it is, so that there often occurs an undesired case where the distorted image is displayed. When the display device receives and displays the image that the video transmission apparatus has transmitted without the reverse distortion, the image distortion caused by the optical device is inevitable in application fields such as HMD, HUD, projector, etc.

The display device proposed by the present invention to solve the problem houses a dedicated image distortion compensation device 500. The image distortion compensation device 500 used in the display device handles an individual pixel position and individual pixel value of each image frame, thereby causing the user to recognize no image distortion.

Specifically, a display device P (10) shown in FIG. 6*a* is a first embodiment of the display device capable of the image distortion compensation in accordance with the embodiment. FIG. 6*a* shows that the image distortion compensation device 500 has been implemented in the display panel 900 shown in FIG. 1. The display device P (10) may further include a memory 400 which temporarily stores the image in a unit of a frame for the distortion compensation, a memory controller 300 which controls the memory 400 (manages the input/output of the memory, etc.), and the image distortion compensation device 500 which handles the pixel position and pixel value of the video signal stored in the memory 400 and generates a distortion-compensated video signal.

A display device T (20) shown in FIG. 6*b* is a second embodiment of the display device capable of the image distortion compensation in accordance with the embodiment. FIG. 6*b* shows that the image distortion compensation device 500 has been implemented in a Timing CONtroller (TCON) 1200' which drives the display panel 900. Here, the TCON 1200 may be a display panel driver. The configuration of the TCON 1200 is shown in FIG. 7. Since the image distortion compensation device 500 should handle and output the arrangement of the data segment such that the display panel 900 can recognize it, it is desirable that the image distortion compensation device 500 should be included in a display panel dedicated logic 600 or display panel drive module 600. Here, a pre image processing device 200 and a post-processing modules 700 are omitted in FIGS. 6*b* to 6*d*. In the display device T (20), the display panel 900 only functions to output the input video signal to the pixel array, and the TCON 1200' including the image distortion compensation device 500 compensates selectively the image distortion in accordance with the characteristics and application of the display panel 900 before the video signal is transmitted to the display panel 900.

A display device A (30) shown in FIG. 6*c* is a third embodiment of the display device capable of the image distortion compensation in accordance with the embodiment. FIG. 6*c* shows that the image distortion compensation device 500 has been implemented in a special kind of a system semiconductor 1300 (an application processor AP, a central processing unit (CPU), a graphics processing unit (GPU, GPGPU), a digital signal processor (DSP), an application specific integrated circuit (ASIC), a field programmable gate array (FPGA), etc.) capable of processing digital images and driving the display panel 900 without a separate timing controller. As with the foregoing display device T (20), in the display device A (30), it is desirable that the image distortion compensation device 500 should be included in a device for driving the display panel 900. In the display device A (30), the display panel 900 only functions to output the input video signal to the pixel array, and the system semiconductor 1300 compensates selectively the image distortion in accordance with the characteristics and application of the display panel 900 before the video signal is transmitted to the display panel 900. Therefore, the display device A (30) is able to implements the image distortion function through software by using a computing power of a general-purpose processor. However, when the image distortion compensation is performed by software, a computational burden increases, and thus, an excessive load is added to the processor. Also, since image processing delay is immediately recognized by the user due to the characteristics of the display device, it is preferable that the driving of the display panel 900 should be designed by a dedicated hardware circuit in order to improve the efficiency.

A display device A' (40) shown in FIG. 6*d* is a fourth embodiment of the display device capable of the image distortion compensation in accordance with the embodiment. FIG. 6*d* shows that the image distortion compensation device 500 has been implemented in a special kind of a system semiconductor 1300' capable of processing digital images. In the display device A' (40), the TCON 1200 only functions to drive the display panel 900 connected to the TCON 1200 by using the input video signal, and also the display panel 900 only functions to output the video signal received from the TCON 1200 to the pixel array. The system semiconductor 1300' compensates selectively the image distortion in accordance with the characteristics and application of the display panel before the video signal is transmitted to the TCON 1200, and then transmits the video signal in accordance with a data channel interface with the TCON 1200. Unlike the foregoing display device A (30), since the separate TCON 1200 of the display device A' (40) drives the display panel, it is possible to implement that the image distortion compensation device 500 can be housed as one of an image processing logic of the system semiconductor 1300.

Here, when a general-purpose processor is housed, the image distortion compensation function may be also implemented by software. However, as described in the third embodiment, it is desirable that the image distortion compensation device should be designed by a dedicated hardware circuit.

The display displays the image through various processors. Such processors may be implemented as one independent module. Here, for convenience of implementation, the processors may be also implemented to be combined as a large processing block or to be finely divided into smaller function blocks. A main processing block will be described in turn as follows from the input to output. While the processing blocks performing the same function will be described with the same block name, actual detailed configurations thereof will be implemented differently from each other.

First, referring to FIGS. 6*a* to 6*d* and 7, an input interface controller 100 receives the video signal. The input interface controller 100 which has received the video signal receives the pixel value from various input displays (display interface (Data stream)) and converts the pixel value in a form capable of processing digital images, in other words, in the form of RGB or YUV, etc. The input interface controller 100 may assume an input of one or more of various standard video interfaces such as HDMI, display port, MIPI, LVDS, TTL, CMOS, LVCMOS, etc. Also, since RGB value or YUV value as well as a synchronization signal such as VSYNC, HSYNC, DE, etc., may be inputted to the input interface controller 100 or may be encoded in the form of a packet and then inputted to the input interface controller 100 in accordance with VESA display standard, the input interface controller 100 functions to analyze each input format and generate the data segment and the synchronization signal in a form capable of processing according to each display device.

The memory controller 300 controls the input and output of the memory (frame buffer) 400 in which the input image is temporarily stored (data in/out). Here, the memory 400 may be a common frame memory. A volatile memory which provides a sufficient bandwidth and has low access latency, such as SDRAM, eDRAM, SRAM, etc., is used as the memory 400. However, since there is no limit to this, various types of memories can be employed. Here, since the length, address access method, and timing of the data depend on the kind and configuration of the used memory 400, it is required to provide a method for accessing the data segment of the video signal. Therefore, when the data segment of the image is accessed by a logical address such as coordinates, etc., the memory controller 300 functions to convert the logical address into a physical address of the memory and to adjust a data input output protocol or timing. Here, it is described in the description of the present invention that the input and output requests of the data segment is assigned to the coordinates in the image and the pixel value corresponding to the coordinates is read from or written to the memory by using the physical address (physical memory address with rd/wr). However, in the actual implementation, both of the memory controller 300 and the memory 400 may be implemented. Also, in the actual implementation, the input and output of the memory controller 300 are processed by using a separate buffer, or the logical address of the image is converted into the physical address of the memory by using a separate address conversion device before the logical address is inputted to the memory controller 300, so that the memory controller 300 may be variously implemented such that, for example, the memory controller 300 only functions as an interface with the memory on the basis of on the physical address. In the following description of the present invention, the coordinate value is represented by (x, y) and the pixel value corresponding to the (x, y) coordinates is represented by P(x, y). The input and output requests of the data segment may include the coordinate value in the image and additional color information. However, unless absolutely necessary, for clarity of the description, it is premised that the input and output requests of the data segment use only the coordinate value.

The image distortion compensation device 500 included in the display device according to the embodiment may be an image distortion compensation device shown in FIG. 8. The image distortion compensation device 500 may generate data segment of an image which has been arbitrarily distorted by handling the data segment of the image received by the display device in accordance with how much the image is distorted, and may output the data segment together with a newly generated synchronization signal in consideration of delay during the operation process required for the distortion. Specifically, the image distortion compensation device 500 may include a backward mapper 510, a look-up table 520, a prefetcher 530, a fraction buffer 540, and an interpolator 550.

The backward mapper 510 may calculate a coordinate value to which reference should be made in order to make an artificially distorted image by using distortion information received from the look-up table 520 in order to make an artificially distorted image. The backward mapper 510 is a backward/reverse mapper. The backward mapper 510 generates the coordinate value $(x_d, y_d)$ of an individual pixel of an output image to which the distortion for compensation has been applied. Considering that the coordinate value of the corresponding pixel is distorted in the image, the backward mapper 510 is a module for calculating the coordinate value $(x_r, y_r)$ that is a criteria for which pixel should be referenced in the original input image. In other words, the backward mapper receives the degree of the distortion and the synchronization signal, and thus, generates the coordinate value $(x_r, y_r)$ of the pixel. Also, based on the synchronization signal, the backward mapper 510 estimates which area of the image is stored from the prefetcher 530 to fraction buffer 540, thereby determining whether the pixel value corresponding to the coordinate value $(x_r, y_r)$ that is a criteria and neighboring pixel values thereof can be withdrawn or not. Also, the backward mapper 510 may output the coordinate value $(x_r, y_r)$ to the prefetcher 530. The backward mapping is used in the image processing for the image distortion compensation because some pixel values of a final image may not be correctly represented due to the use of forward mapping. Here, the coordinate value $(x_d, y_d)$ is a coordinate value of a pixel of the image artificially distorted for the compensation and means the coordinate value of the image to be outputted. The coordinate value may be represented by an integer. The coordinate value $(x_r, y_r)$ means a coordinate value in the original input image, which should be referenced in order to make an artificially distorted output image. The calculation result of the coordinate value $(x_r, y_r)$ may be represented by a rational number (a decimal).

The look-up table 520 calculates the degree of the distortion of the image outputted from the display panel 900 and stores. The look-up table 520 is used to calculate the coordinate value $(x_r, y_r)$. The degree of the distortion of the image may be represented by a distortion factor of a mathematical modeling for the image distortion.

Also, the degree of the distortion of the image stored in the look-up table 520 may be a distortion amount extracted in the form of a vector through a process shown in FIG. 9. In this case, the look-up table 520 may receive a section address of an M×N grid, which is calculated based on the coordinate value $(x_d, y_d)$ of a pixel of the image. The look-up table 520 may output a distortion amount at the vertex of a section corresponding to the input section address, which is represented in the form of a vector. An algorithm to generate a vector value to be stored in the look-up table 520 will be described as follows with reference to FIG. 9.

First, the kind of the image distortion to be applied to the display device or an optical device to be used is selected (S100). Specifically, the image distortion may include a relatively simple distortion such as the movement and rotation of the image, magnification and reduction of the image, etc., or may include a complex distortion such as Pincushion, Barrel, Mustache, keyston, chromatic aberration, etc., based on the optical device to be used. The image distortion may show all of the above kinds of the distortions in a complicated manner. The optical device may be comprised of a single lens or a plurality of lenses or may be obtained by designing a prism, a light guide, a mirror, a polarizing film, etc., in a complicated manner Since the optical device to be used finally produces one distorted image, a final degree of the distortion can be represented by numerical values during the design of the optical device.

To extract the degree of the distortion of the image, the display area is divided into M×N grid sections (S200). Specifically, respective sections are generally intended to have the same size. Considering the horizontal/vertical resolution of the display, it is preferable that the division is performed in such a manner as to make it easier to calculate later. In the case of the distortion caused by a lens, the distortion occurs noticeably at the edge of the image and does not appear around the focus of the lens. Considering this, it can be considered that the division is performed densely at the edge of the image and sparsely at the central portion of the image. The display area may be divided into sections differently according to the kind of the distortion to be changed or compensated. For example, if the complex distortion occurs, M and N have a large value depending on the degree of the distortion of the image.

After the display area is divided in the form of a grid, the degree of the distortion of the image is extracted at the vertex in the form of a parameter by means of a distance difference between coordinates where the pixel of the input image is displayed in each rectangular section and coordinates where the pixel is displayed in the image distorted by the optical device 1000, or the like (S300). Specifically, a XY coordinate system is applied to the image and the coordinate value of the vertex may be represented by $(x_i, y_i)$. Since the vertex of the adjacent section is shared, the distortion amount can be extracted in (M+1)×(N+1) number of the coordinates. Here, the distortion amount can be extracted by receiving and using a measured value after the design of the optical device or by a final display result of the input image through use of a grid pattern or a cover value. Here, regarding the obtained distortion amount, an error of a distorted image (represented by a thin line) compared with an ideal image without distortion (represented by a thick line) appears, as shown in the upper figure of FIG. 10, in the form of a distance difference. That is, when the M×N grid pattern to be applied to the look-up table 520 is overlaid as it is on the input image, which position in the actual output image the pixel value that should be located at the vertex of each rectangular section has been moved to by the image distortion can be represented by a length. While the upper figure of FIG. 10 shows an example in which the image result which has passed through the optical device shows a pincushion type phenomenon, the perspective distortion can be represented in the same manner. When each degree of the distortion is obtained according to the RGB colors, the chromatic aberration may occur.

A unit of the extracted degree of the distortion is changed according to the display resolution and vectorized (S400). Specifically, according to the step S400, a unit of the distortion amount extracted in step S300 is not only changed according to the display resolution, and but also is vectorized. As shown in the lower figure of FIG. 10, in the case of the optical device 1000, the focus of the optical device 1000 is determined as (0, 0), so that the degree of the distortion can be represented by the position change of the pixel. In the case of a non-optical device 1000, the center of the image is determined as (0, 0), so that the degree of the distortion can be represented by the position change of the pixel. The lower figure of FIG. 10 shows an example of the coordinate value difference of an HD image (1280×720). Since the distortion does not occur in a portion without change, the section corresponding to the portion uses the pixel value of the input image as it is, so that the amount of operations is reduced. Finally, the converted vector is stored (S500).

As such, according to the embodiment, the difference between the position of the grid before distortion and the position of the grid of the distorted image is approximated in the form of a rational number, so that the degree of the distortion may be generated in the form of a vector.

Referring back to FIG. 8, a data segment $P(x_u, y_u)$ of the input image, which is referenced at the time of making an artificially distorted image for the compensation, is stored in a buffer in advance and managed by the prefetcher 530 (fraction buffer management). That is, the prefetcher 530 receives beforehand a certain amount of data to be referenced in order to minimize the delay time caused by image processing and stores in the fraction buffer 540. For this purpose, the prefetcher 530 may process the received data segment in the form appropriate for the fraction buffer 540 and transmit to the fraction buffer 540. Also, based on the reference coordinate value $(x_r, y_r)$ received from the backward mapper, the prefetcher 530 may withdraw neighboring pixel values of corresponding coordinates from the fraction buffer 540 and transmit to the interpolator 550. For this, the coordinate value to be withdrawn of the pixel can be calculated from the reference coordinate value $(x_r, y_r)$. That is, the prefetcher 530 receives the data segment and the synchronization signal, requests the fraction buffer 540 to store the data segment, transmits or regenerates the synchronization signal to be transmitted to the backward mapper 510, loads from the fraction buffer 540 the coordinate value $(x_r, y_r)$ of the pixel and pixel values corresponding to a coordinate value spaced apart from the coordinate value $(x_r, y_r)$ of the pixel by at least 1, and transmits the loaded pixel values to the interpolator 550.

The fraction buffer 540 receives the data segment corresponding to some areas among all of the data segments of the input image from the prefetcher 530 and stores (updates). Also, the fraction buffer 540 may receive a request for withdrawing the pixel value corresponding to neighboring pixel coordinates of the reference coordinates $(x_r, y_r)$ for interpolation and output the requested pixel value. Here, for the purpose of the efficient management of the buffer and minimization of the delay time, the fraction buffer 540 may be comprised of multiple fraction buffers having different structures and sizes.

The position of the pixel to be referenced tends to closely gather in time and space. Therefore, in a case where the image distortion compensation device is connected directly to the memory controller 300 in such a way as to directly access the memory 400, in other words, in the case of the embodiments of the display device P and the display device A' of FIGS. 6a and 6d, the prefetcher 530 may be intended to immediately request and process a value required for the memory controller 300. However, the higher the resolution, the more the pixel value to be processed in a unit time and the more the amount of calculation of the position of the pixel to be referenced. Therefore, it is inefficient to directly access the memory every time. Such a method may be possible when the resolution of the display is not high. However, since the memory 400 has a limited bandwidth and higher power consumption due to frequent access, an ultra-high resolution image processing may not be possible by directly accessing the memory 400 every time. The pixel value is generally stored in the memory 400 in a continuous form. Fortunately, the coordinate values of the pixel to be referenced are close in time and space. Therefore, in a case where the pixel to be processed is fetched by referencing the memory 400, if the pixel values around the pixel to be processed are read together at a time and stored in the fraction buffer 540 and used, it is possible to efficiently use the bandwidth of the memory 400 and to improve the data access speed. Here, the severer the image distortion is, the farther the position of the pixel to be referenced in the input image is spaced. Additionally, the pixels to be referenced may be also dispersed. Therefore, for the purpose of a system performance, it is important to effectively select and read in advance the data to be referenced. The simplest method is as follows. Considering that the display panel 900 processes in a unit of a line, after several lines are read beforehand from a video memory and stored in the fraction buffer 540, the display panel checks that all of the lines to be referenced have been read and processes in order. Then, after data of one line is processed, a new line is updated in the buffer where a line which has not been referenced is stored. Also, for more efficient memory access, the memory 400 is updated in a unit of a block having a size of A×B and is used. A more advanced method is that information such as the maximum range, etc., of the pixel value to be referenced is transmitted and received between the backward mapper 510 and the prefetcher 530, and thus, data to be loaded in a fraction memory buffer is processed by minimum video memory access. During this process, a memory access pattern obtained through pre-training or pre-analysis, etc., can be used in the optimization method.

The interpolator 550 reduces image quality degradation and interpolates the pixel value for improving the image quality. The interpolator 550 receives neighboring pixel values to be referenced for the interpolation, which have been produced from the coordinate value $(x_r, y_r)$ calculated by the backward mapper 510. The interpolator 550 receives the neighboring pixel values of $(x_r, y_r)$, which have been calculated from the coordinate value $(x_r, y_r)$ to be referenced in an original image pixel in order to calculate an artificially distorted pixel data P $(x_d, y_d)$ corresponding to the coordinate value $(x_d, y_d)$ of each pixel in the image distorted for the compensation, and applies an interpolation algorithm. The calculated value P$(x_d, y_d)$ of the arbitrarily distorted pixel is outputted together with a synchronization signal that has been newly generated in consideration of the delay time until the value P$(x_d, y_d)$ is calculated, and thus, an image distorted for the compensation is created. The interpolation algorithm used by the interpolator 550 performs a trade-off between the output image quality and the amount of operations, thereby selectively applying one of various interpolations such as Bilinear interpolation, Nearest neighbor replication, Median interpolation, Edge sensing interpolation, Bicubic interpolation, Spline interpolation, etc. That is, the interpolator 550 may interpolate the loaded pixel values received from the prefetcher 530 and output to the display panel 900.

The display panel drive module 600 receives not only the data segment the image temporarily stored in the memory 400 in a unit of a frame, but also the synchronization signal, reconstructs the data segment in accordance with the driving method of the display panel 900, and outputs the reconstructed data segment together with the newly generated synchronization signal. Most of the display panel drive module 600 requests an RGB value from the coordinates (0, 0) of the image in a unit of a traverse row, receives and processes the requested value, and repeats the requesting and processing in a manner of receiving the pixel values of one line and processing the next line, until one image frame is completely processed. Regarding a typical LCD or OLED, since the RGB value of one pixel is simultaneously represented, the request is possible only by the coordinates of the image. However, regarding a micro display using a color sequential method such as Liquid Cristal on Silicon (LCoS) method, Digital Light Processing (DLP) method, etc., the requested value should be processed according to each R/G/B color. Such a method is based on the driving method of the display panel 900. In the present invention, it is possible to use the image distortion compensation device 500 in any consistent method. The display panel drive module 600 receives the pixel value based on the coordinates of the pixel to be displayed and outputs to the display panel. When the image distortion compensation device 500 is implemented in the display panel drive module 600, the image distortion compensation device 500 receives the data segment reconstructed for the driving of the display panel 900 as well as the newly generated synchronization signal, and uses them in the image distortion compensation. Also, the image distortion compensation device 500 makes the data segment of the artificially distorted image and outputs the data segment together with the synchronization signal regenerated in such a way as to be delayed as long as the delay time caused by the operation for the distortion compensation.

Referring to FIG. 7, the pre image processing device 200 may receive RGB or YUV from the input interface controller 100. The pre image processing device 200 performs required image processing before the data segment converted in the form capable of image processing is stored in the video memory (or a frame buffer). The pre image processing device 200 is able to implement various image processing algorithms for the improvement of the image quality, or for operations such as the change of data structures, data compression for efficient use of the memory, etc. Specifically, the pre image processing device 200 may form a structure for easily and efficiently processing the data in accordance with the structure of the memory, for example, arranging data in accordance with a memory word or data bus width, or may reduce the data to be stored by sub-sampling, bit depth handling, vertical/horizontal decimation, etc. The pre image processing device 200 may selectively consider various processing such as change of the image brightness or contrast, change of the pixel value based on a histogram analysis, or improvement of the image quality by applying filters, etc.

The post-processing modules 700 is in charge of a post processing of the digital image processing and is generally disposed before an output interface controller 800. The post-processing modules 700 may selectively add image processing modules when post processing such as image quality improvement, packetization, compression, etc., is required before the pixel value is outputted to the display. Generally, a module which improves various errors, e.g., gamma, etc., of the display panel through digital image processing may be added, or a process of serializing or parallelizing the data in accordance with the output interface or of making or compressing a packet in accordance with a display interface standard may be included. For clarity of the description, the pre image processing device 200 and the post-processing modules 700 are omitted in the display devices 20, 30, and 40 shown in FIGS. 6b to 6d.

The output interface controller (data stream) 800 receives raster-type data to which an image post processing has been applied from the display panel drive module 600 or the post-processing modules 700, and the output interface controller 800 transmits to the display panel 900 or the timing controller 1200. Like the input interface controller 100, the output interface controller 800 may assume an output of one or more of various video interfaces such as HDMI, display port, MIPI, LVDS, TTL, CMOS, LVCMOS, etc., in accordance with the display panel.

The display panel 900 may display the artificially distorted image through the aforementioned configuration. The display panel 900 may use a method of displaying the image through the optical device such as LCoS, DLP, etc. The display device may be configured in the form of further adding optical devices even when the OLED or LCD is used.

In this case, as described above, the distortion information is different according to the optical device 1000 to be used. Therefore, after the distortion information is extracted according to the optical device 1000 and is converted according to the resolution of the display, the converted distortion information should be updated in the look-up table 520. Accordingly, the user is able to recognize the compensated image.

As such, the image distortion compensation device 500 according to the embodiment updates distortion amount information of the look-up table 520, thereby compensating a portion of the image distortion or complex distortion.

Here, when the image distortion is not severe enough for human not to recognize, the image distortion compensation device 500 according to the embodiment is also able to perform a bypass operation. In this case, the data segment and synchronization signal which have to be inputted to the image distortion compensation device 500 may be immediately outputted without passing through the image distortion compensation device.

Also, when the optical device is included in the display panel, the image distortion compensation device 500 according to the embodiment handles the pixel position and pixel value of the image data stored in the memory 400 and the pixel position and pixel value according to the image distortion of the optical device, thereby generating compensated image data.

FIG. 11 is a flowchart of the compensation method using the display device capable of image distortion compensation in accordance with the embodiment.

Referring to FIG. 11, since the display panel 900 should process the input images which are continuously inputted in a streaming manner, a process in which the data segment inputted from the input interface controller 100 is stored in memory (frame buffer) 400 is omitted. The memory controller 300 may input and output at the same time according to the kind of the memory (Multi-port memory) or may adjust a timing for reading and writing the data by arbitrating the input and output. As long as a memory having a bandwidth sufficient to process a target input/output resolution and frame rate even in any cases is used, it can be seen that a data input unit and a data output unit of the memory controller 300 perform independent operations. Therefore, in the algorithm of FIG. 11, when the display panel drive module 600 requests data in accordance with a timing required for driving the display panel, which process is used to perform the distortion compensation has been described by taking a color sequential method of LCos or DLP as an example. As described above, the display device capable of image distortion compensation in accordance with the embodiment can be applied to various color spaces such as RGB, RGBW, Y-Co-Cg, YUV, YCbCr, etc., and driving methods by a minor change according to the operation method of the panel in the implementation.

The display panel operating by the color sequential method requests the each R/G/B color-based image in a unit of a frame. In ($x_d$, $y_d$, c) of FIG. 11, a two-dimensional XY coordinate system is applied to each image, a width direction coordinate of each pixel is represented by $x_d$, a height direction coordinate of each pixel is represented by $y_d$, and a frame according to each color is represented by c. Here, c means one color among R/G/B. Also, regarding the value of c, for convenience, it is premised that 0 represents a red color, 1 represents a green color, 2 represents a blue color, and the frame is represented in the panel in the order of R→G→B. However, the display panel is not necessarily driven only by R/G/B. The display panel can be driven in accordance with the panel through any combination of order of an R/G/B/W (white) or R/G/B frame.

($x_d$, $y_d$, c)=(0, 0, 0) of step S1010 means that an initial pixel coordinates to be displayed on the display panel 900 is requested first. Such a request is performed by the display panel drive module 600 in the display device T or the display device A of the embodiment shown in FIGS. 6b and 6c. However, in the display device P or the display device A' of the embodiment shown in FIGS. 6a and 6d, the memory controller 300 may generate a pixel coordinates to be displayed on the screen in accordance with the image resolution of the display panel, etc.

Steps S1020 to S1100 mean that when the pixel value is requested with the increase of $x_d$ until the end of each row, the pixel value of the next row is requested in order and when one color frame is ended, the next color frame value is similarly requested. When the coordinate value stored in the video memory is stored and read in a unit of a packet, the increased value of each coordinate may be a value other than 1. For example, when a size of one word of a video memory data is 32 bits and a color depth of one pixel is 8 bits, it is more efficient to store the coordinate value in a unit of four pixels. In this case, the increment of $x_d$ is 4. It can be regarded that, during a period of time when the display displays the image, the output coordinate value of step S1090 is ceaselessly and continuously inputted to the distortion compensation device in a streaming manner or generated.

The display device capable of image distortion compensation in accordance with the embodiment checks first whether or not there is a need to update the look-up table 520 in accordance with the optical device 1000 or the type of the final image to be compensated (S1110). When the look-up table 520 is not set or needs to be updated, the look-up table 520 is updated (S1130) by directly receiving the vector value to be stored in the look-up table 520 or by reading (S1120) a vector value necessary for the look-up table 520 from a non-volatile memory. This process is performed only one time at the time of initially driving the display panel 900. Also, this process causes the look-up table 520 to be updated through S1110 to S1130 when the look-up table 520 is required to be dynamically changed during performing this process, for example, when an existing value should be changed due to the change of the magnification of the lens or the change of the projection direction of the lens, etc. The value stored in the look-up table 520 can be used as the distortion vector value to be updated in the look-up table 520.

After the update is completed by the distortion vector value required by the look-up table 520, which section in the grid sections the coordinate value ($x_d$, $y_d$, c) of the pixel is included in is found based on the coordinate value ($x_d$, $y_d$, c) of the pixel, which has been inputted to the image distortion compensation device 500 according to the embodiment (S1140). Here, the size of the grid or the interval of the target point may be changed. This process can be easily performed by the output resolution of the display panel 900 and a value obtained by converting the size of the grid into a resolution. After the section in which ($x_d$, $y_d$, c) is included is found, a distortion change amount at the vertex of the corresponding section represented by a vector is read (S1150). By using the read vector value and ($x_d$, $y_d$, c), the coordinate value ($x_r$, $y_r$, c) is calculated to find which pixel value stored in the memory 400 is referenced to obtain a pixel value for the compensation (S1160). Here, ($x_r$, $y_r$, c) is a pixel coordinate estimated in the input image that should be referenced to make the compensated image. After a relative coordinate value in the corresponding section including ($x_d$, $y_d$, c) is calculated, a sum of weight values is calculated based on the distortion amount of the vertex. A coordinate value obtained by adding the calculated sum of weight values to ($x_d$, $y_d$, c) is a coordinate ($x_r$, $y_r$, c) to be referenced. It is possible to use another method such as tangential optical modeling as well as the method of calculating the coordinates of the pixel to be referenced through steps S1140 to S1160. For instance, the degree of the distortion may be a parameter k of the tangential optical modeling. The coordinate ($x_r$, $y_r$, c) is represented by a rational number. When a final pixel value is outputted as the coordinate value of the pixel obtained by rounding off, rounding up, or rounding down without interpolating, the pixel value is not normally represented and Zigzag occurs. To minimize such a phenomenon and display a normal image, an interpolation process should be performed. Therefore, the pixel coordinate value required for the interpolation is calculated (S1170). By using commonly used bilinear interpolation, the position of the pixel to be referenced through an integer coordinates combination of values obtained by respectively rounding up and rounding down $x_r$, $y_r$ represented by a rational number is designated. Therefore, the maximum four pixel positions are calculated, and the pixel positions obtained through such a calculation is represented by neighboring pixel positions.

It is checked whether the neighboring pixel position exists in the buffer 540 or not (S1180). Here, when the neighboring pixel position does not exist in the buffer 540, the data segment to be referenced in the video memory is requested beforehand by the memory controller 300 through the prefetcher 530 (S1190). Here, when a new pixel data is read in the video memory, the prefetcher 530 updates a value of the fraction memory buffer, and minimizes the delay of steps S1180 to S1210.

Meanwhile, when the data segment corresponding to the neighboring pixel position exists in the buffer 540, the coordinate values of the pixel is read from the buffer 540 (S1210). Based on which neighboring pixel position among neighboring pixel positions to be referenced by the coordinates ($x_r$, $y_r$, c) is closer to the pixel value for the output image, the pixel value is calculated by applying a weight value (S1220). Then, for the purpose of driving the display panel 900, the calculated result is transmitted together with the coordinates ($x_d$, $y_d$, c). Such a calculated value corresponds to the value of the pixel arbitrarily distorted for the distorted image compensation. The pixel value is outputted to another image processing module or the output interface controller 800 (S1230) such that the display panel 900 is driven.

Here, in various distortions, several values of the look-up table are provided in advance and the look-up table is dynamically updated according to situations, so that the look-up table can be applied to the image processing. For example, regarding the Keyston, the tilt of the display device is detected, so that the look-up table is updated in real time.

In the display device capable of image distortion compensation in accordance with the embodiment, after the complex distortion caused by the optical device 1000 is divided in the form of the M×N grid pattern, only the distortion amount at the vertex of the rectangular section is stored in the form of a vector in the look-up table 520, and the vector value of the look-up table 520 is changed, so that it is possible to compensate the perspective distortion, and the aberration distortion as well as the lens distortion appearing in the form of pincushion, barrel, or mustache. Also, by changing the vector value used in the display device capable of image distortion compensation in accordance with the embodiment, the image processing such as the movement and rotation of the image, magnification and reduction of the image, etc., can be performed by applying the algorithm of the present invention.

FIGS. 12a to 12d are views for describing an example of compensating the pincushion-type phenomenon by using the image distortion compensation device according to the embodiment. FIG. 12a shows a non-distorted input image. FIG. 12b shows a distorted image displayed on a screen after the input image of FIG. 12a passes through the optical device 1000. FIG. 12c shows an image which is displayed on the display panel 900 and is obtained by artificially distorting the input image of FIG. 12a by changing the vector of the look-up table such that the barrel distortion is operated for the compensation. FIG. 12d shows the image of the display panel 900 of FIG. 12c which has passed through the optical device 1000 used in FIG. 12b and is seen by the user.

FIGS. 13a to 13d are views for describing an example of compensating a vertical keyston distortion of a kind of perspective distortion by using the image distortion compensation device according to the embodiment. Here, the perspective distortion is commonly shown in a projector, etc. FIG. 13a shows a non-distorted input image. FIG. 13b shows a distorted image displayed on a screen after the input image of FIG. 12a passes through the optical device 1000. FIG. 13c shows an image which is obtained by artificially distorting the input image of FIG. 13a by changing the vector of the look-up table such that the Keyston is operated for the compensation in a reverse direction to that of FIG. 13b. FIG. 13d shows the image of the display panel 900 of FIG. 13c which has passed through the optical device 1000 used in FIG. 13b and is seen by the user.

FIGS. 14a and 14b are views for describing an example of compensating chromatic aberration distortion by using the image distortion compensation device according to the embodiment. Here, the aberration distortion commonly occurs at the time of using the optical device 1000 using the low-cost high-magnification lens. FIG. 14a shows the chromatic aberration severely occurs at the edge of the image. FIG. 14b shows a final image which is obtained by artificially distorting the input image by using a separate look-up table according to each R/G/B color and is seen by the user. It can be found that the chromatic aberration of FIG. 14b is significantly reduced, though not completely removed, as compared with that of FIG. 14a.

FIGS. 15a and 15b are views for describing an example of applying partial enlargement by using the image distortion compensation device according to the embodiment. FIG. 15b shows an image obtained by enlarging to different scales the top left portion and the bottom right portion of the image to which a bitmap-format font has been inputted. FIG. 15b shows an output image obtained by changing only the distortion vector value of the look-up table without changing other logics. The overall magnified/reduced images can be obtained by applying a similar method only by changing the look-up table vector.

FIGS. 16a and 16b are views for describing an example of applying image rotation by using the image distortion compensation device according to the embodiment. FIG. 16b shows an image obtained by counterclockwise rotating the input image of FIG. 16a. FIG. 16b shows an output image obtained by changing only the distortion vector value of the look-up table without changing other logics. The rotation in the reverse direction can be obtained by applying a similar method only by changing the look-up table vector.

FIGS. 17a and 17b are views for describing an example of applying image movement by using the image distortion compensation device according to the embodiment. FIG.

17b shows an image obtained by moving the input image of FIG. 17a in the bottom right direction. FIG. 17b shows an output image obtained by changing only the distortion vector value of the look-up table without changing other logics. The movement in another direction can be obtained by applying a similar method only by changing the look-up table vector.

As shown in FIGS. 12 to 17, the display device capable of image distortion compensation according to the embodiment is able not only to compensate and process one image but also to process complex distortions or image conversions, for example, distortions of two or more images at a time by adjusting the distorted vector value in the look-up table. Through this, it is possible to show the user a compensated image by moving/rotating/magnifying/reducing the image in accordance with applications as well as possible to cause various distortions caused by the optical device 1000 to be complexly compensated at a time.

The hardware of the display device capable of image distortion compensation in accordance with the embodiment can be implemented in a pipeline manner, thereby increasing the processing speed.

The coordinate of the pixel to be referenced in the display device capable of image distortion compensation in accordance with the embodiment can be calculated more accurately by using various vector values in the look-up table.

While the embodiment of the present invention has been described with reference to the accompanying drawings, these are just examples and do not limit the present invention. Further, the present invention may be changed and modified in various ways by those skilled in the art without departing from the essential features of the present invention. For example, the components described in detail in the embodiments of the present invention may be modified. Further, differences due to the modification and application should be construed as being included in the scope and spirit of the present invention, which is described in the accompanying claims.

What is claimed is:

1. An image distortion compensation method using a display device capable of image distortion compensation, the method comprising:
   receiving a coordinate value $(x_d, y_d)$ of a pixel of an image to be artificially distorted;
   dividing an area where an image is displayed into M×N grid sections and finding which section in the sections divided by the M×N grid the coordinate value $(x_d, y_d)$ of the pixel is included in;
   first loading to read a distortion change amount which is represented by a vector and is at a vertex of the section in which the coordinate value $(x_d, y_d)$ of the pixel is included in the sections;
   first calculating such that a coordinate value $(x_r, y_r)$ to be referenced is calculated by adding a sum of weight values on the basis of the coordinate value $(x_d, y_d)$ of the pixel and the loaded distortion change amount;
   second calculating to calculate neighboring pixel coordinate values required for interpolation by using the coordinate value $(x_r, y_r)$ to be referenced;
   second loading such that read pixel values corresponding to the neighboring pixel coordinate values calculated in the second calculating are read from a fraction memory buffer;
   third calculating to calculate a pixel value for a compensated output image by applying the weight value on the basis of which pixel coordinate value the coordinate $(x_r, y_r)$ is closer to among the neighboring pixel coordinate values calculated in the second calculating; and
   outputting to output the pixel value for the compensated output image.

2. The image distortion compensation method of claim 1, further comprising, before the finding, checking whether a look-up table is updated or not and updating the look-up table from the memory.

3. The image distortion compensation method of claim 2, wherein the look-up table comprises a plurality of look-up tables comprising different color information.

4. The image distortion compensation method of claim 1, further comprising, between the second calculating and the second loading, checking whether a neighboring pixel position exists in the fraction memory buffer or not and reading a data segment from the memory by using the coordinate value to be referenced.

5. The image distortion compensation method of claim 1, wherein, in the finding, when the distortion is within a predetermined range, it is determined that the distortion has not occurred.

6. The image distortion compensation method of claim 1, wherein, in the finding, an amount of vector data which is stored in a look-up table is reduced to a half or less by using symmetry.

* * * * *